United States Patent [19]

Edwards

[11] 3,904,611
[45] Sept. 9, 1975

[54] PREPARATION OF 17α-PROPADIENYL STEROIDS
[75] Inventor: John J. Edwards, Los Altos, Calif.
[73] Assignee: Syntex Corporation, Panama, Panama
[22] Filed: Feb. 11, 1974
[21] Appl. No.: 441,223

Related U.S. Application Data
[63] Continuation-in-part of Ser. No. 297,855, Oct. 16, 1972, which is a continuation-in-part of Ser. No. 148,174, May 28, 1971, which is a continuation-in-part of Ser. No. 877,521, Nov. 17, 1969, abandoned, which is a continuation-in-part of Ser. No. 817,563, April 18, 1969, abandoned.

[52] U.S. Cl. ............... 260/239.55C; 260/397.45; 260/397.45;
260/397.4; 260/397.5; 424/243
[51] Int. Cl.² ........................................ C07J 17/00
[58] Field of Search.... 260/239.55 R, 397.4, 397.45

[56] References Cited
UNITED STATES PATENTS
3,392,165  7/1968  Edwards et al. ............... 260/239.55
3,392,166  7/1968  Edwards et al. ............... 260/239.55
3,798,215  3/1974  Galantay et al. ............ 260/239.55 C

*Primary Examiner*—Elbert L. Roberts
*Attorney, Agent, or Firm*—Gerard A. Blaufarb; Walter H. Dreger; William B. Walker

[57] ABSTRACT

Disclosed is a process for the preparation of 17α-propadienyl steroids of the estrogen, estrane, and androstane series which contain optional substitution at other positions of the nucleus. This process involves treating a corresponding 3-(substituted propynyl) steroid wherein the substituent is halo, alkylsulfonyloxy, arylsulfonyloxy, tetrahydrofuran-2-yloxy, tetrahydropyran-2-yloxy, or 4-methoxytetrahydropyran-4-yloxy, with an aluminum hydride reagent in organic reaction media. The product 17α-propadienyl steroids in the $\Delta^5(10),9(11)$-estradiene and $\Delta^4,9(10),11$-estratriene series, optionally substituted at the C-3, C-17, and C-18 positions, are new compounds. Certain of the 17α-(3-substituted propynyl) compounds hereof are new compounds, useful as intermediates. The 17α-propadienyl products are useful as estrogenic, antiandrogenic, progestational and anti-fertility agents.

23 Claims, No Drawings

PREPARATION OF 17α-PROPADIENYL STEROIDS

This application is a continuation-in-part of application Ser. No. 297,855, filed Oct. 16, 1972, which is a continuation-in-part of application Ser. No. 148,174, filed May 28, 1971, which is a continuation-in-part of application Ser. No. 877,521, filed Nov. 17, 1969, now abandoned, which is a continuation-in-part of application Ser. No. 817,563, filed Apr. 18, 1969, now abandoned.

The present invention relates to a novel process which is useful in the preparation of useful steroidal compounds. Specifically, this invention is directed to a process useful in preparing steroidal 17α-allenes.

Certain of the steroid compounds which have a 17α-ethylenically unsaturated side chain, specifically a 17α-propadienyl (allene) grouping, are novel, particularly those 17α-propadienyl steroids of the 6,6-difluoro series and those 17α-propadienyl steroids of the $\Delta^{4,9(10),11}$ series and those 17α-propadienyl steroids of the $\Delta^{5(10),9(11)}$ series, represented respectively by the Formulas (A), (B), and (C):

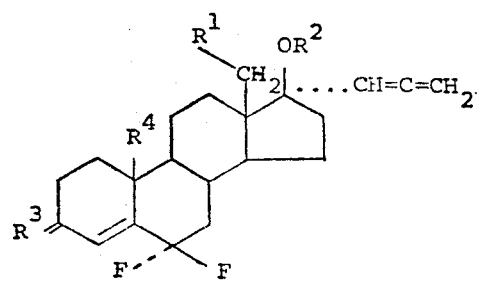

(A)

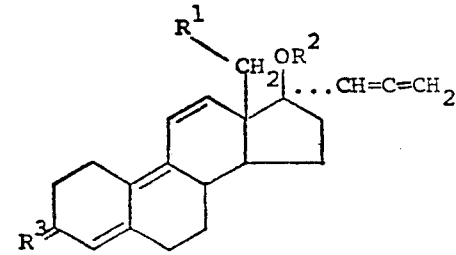

(B)

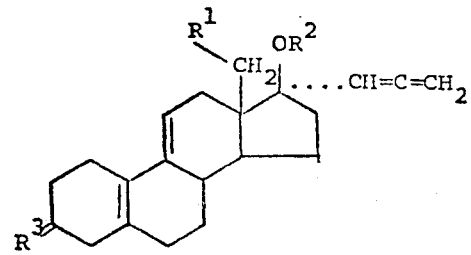

(C)

Other 17α-propadienyl steroids have been described. For example, U.S. Pat. Nos. 3,392,165 and 3,392,166 disclose, inter alia, those derivatives of the estrogen, estr-4-ene, estr-5(10)-ene and androst-4-ene series as represented by Formulas (II), (III), and (IV):

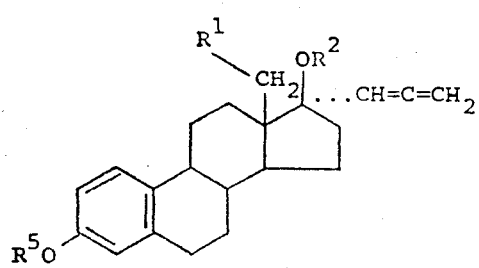

(II)

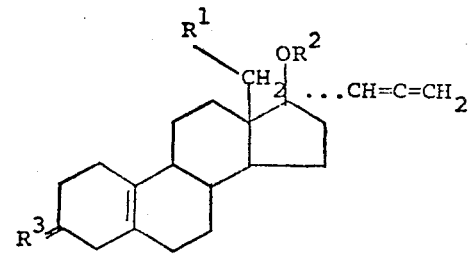

(III)

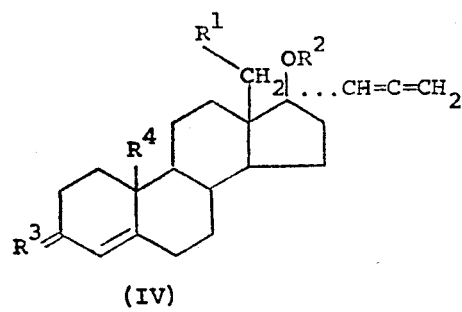

(IV)

Other useful 17α-propadienyl steroids can be represented by the following formula:

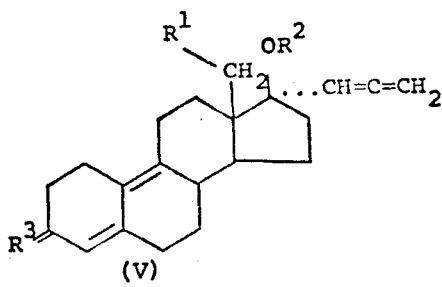

(V)

In the above and succeeding formulas, R¹ is hydrogen or lower alkyl of from 1 to 3 carbon atoms, inclusive; R² is hydrogen, tetrahydrofuran-2-yl, tetrahydropyran-2-yl, 4-methoxytetrahydropyran-4-yl, or a carboxylic acyl group containing less than 12 carbon atoms; R³ is an oxo group or the group

in which R⁶ is hydrogen, tetrahydrofuran-2-yl, tetrahydropyran-2-yl, 4-methoxytetrahydropyran-4-yl, or a carboxylic acyl group containing less than 12 carbon atoms; R⁴ is hydrogen or methyl; and R⁵ is hydrogen, lower alkyl of from 1 to 8 carbon atoms, inclusive, cycloalkyl, tetrahydrofuran-2-yl, tetrahydropyran-2-yl, 4-methoxytetrahydropyran-4-yl, or a carboxylic acyl group containing less than 12 carbon atoms.

The 17α-propadienyl derivatives in the estra-1,3,5(10)-triene series (Formula II) possess estrogenic and antiandrogenic activity and are useful in the manner such agents are customarily used for the treatment of conditions responsive to estrogenic and antiandrogenic agents, such as the control and regulation of fertility and the treatment of acne, benign prostate hypertrophy, and hirsutism in females. The 17α-propadienyl derivatives in the 6,6-difluoroandrostene, 6,6-difluoro-19-norandrostene, estr-5(10)-ene, estr-4-ene, androst-4-ene, and estra-4,9(10)-diene series (Formulas A, II, IV, and V demonstrate progestational and pituitary inhibiting and anti-fertility activity and are useful in the manner corresponding to such activity such as in the treatment of various menstrual disorders and in the control and regulation of fertility.

The 17α-propadienyl compounds in the $\Delta^{4,9(10),11}$-estratriene and $\Delta^{5(10),9(11)}$-estradiene series (Formulas B and C) also demonstrate progestational, pituitary inhibiting, and anti-fertility activity and are also thus useful in the manner corresponding to such activity as above described.

The novel process of the present invention comprises reacting a 17α-(3-substituted propynyl) steroid, wherein the substituent is halo, alkylsulfonyloxy, arylsulfonyloxy, tetrahydrofuran-2-yloxy, tetrahydropyran-2-yloxy, or 4-methoxytetrahydropyran-4-yloxy, with an aluminum hydride reagent, to prepare a corresponding 17α-propadienyl steroid.

When operating in accordance with preferred embodiments, the present invention is particularly useful for the preparation of the 17α-propadienyl steroids of the estrogen, estrane, and androstane series depicted above in Formulas (A), (B), (C), (II), (III), (IV), and (V).

Suitable aluminum hydride reagents include those containing at least two available hydrogen atoms such as aluminum hydride, lithium aluminum hydride, lithium di-(2-methoxyethoxy)-aluminum hydride, lithium diisobutylaluminum hydride, and sodium aluminum hydride.

The aluminum hydride reagent is conveniently employed in at least chemical equivalent amounts with the steroid starting material. Amounts in excess of this, upwards of a 20 to 50 molar excess, can also conveniently be employed. Preferred embodiments involve the use of from about 1.5 moles to 20 moles of aluminum hydride reagent per mole of starting steroid.

The reaction is conducted in the presence of organic liquid reaction medium. Suitable media include the customary organic solvents, for example, ethers, such as dimethyl ether, dioxane, methyl propyl ether, tetrahydrofuran, and the like; saturated aliphatic hydrocarbons, such as pentane, hexane, octane, and the like; and aromatic hydrocarbons, such as benzene, toluene, mesitylene, and the like.

The reaction is conducted at temperatures ranging from about 20° to about 120°C. and preferably at the boiling point of the reaction mixture and under reflux. The reaction is continued for a period of time sufficient to complete the reaction ranging from about 2 hours to about 48 hours. Longer or shorter periods may be employed depending upon the choice of reaction temperature and reactants employed.

In a preferred procedure, the starting steroid compound, dispersed in an organic liquid reaction medium, is treated with aluminum hydride reagent on at least a mole per mole basis. The resulting reaction mixture is then heated with stirring for a sustained period of time. Upon completion of the reaction, the respective product is separated and recovered from the reaction mixture via conventional techniques such as filtration, decantation, evaporation, chromatography, recrystallization, and the like.

Certain of the 17α-(3-substituted propynyl) compounds, useful as herein described, are novel compounds and can be represented as follows:

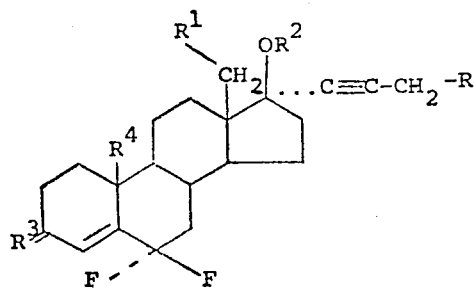

(VI)

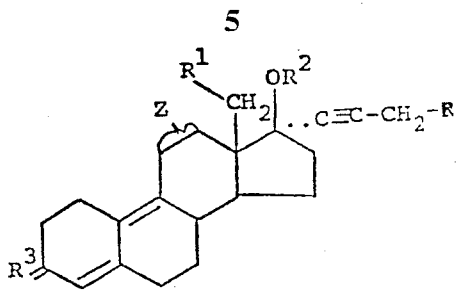

(VII)

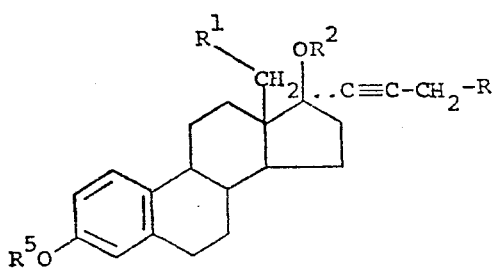

(VIII)

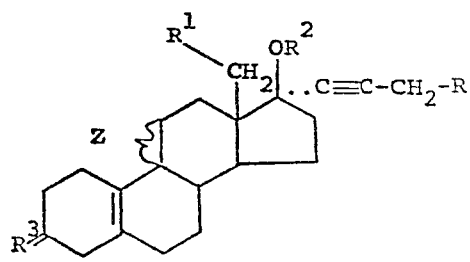

(IX)

wherein,

R is tetrahydrofuran-2-yloxy, tetrahydropyran-2-yloxy, 4-methoxytetrahydropyran-4-yloxy, halo, alkylsulfonyloxy, hydroxy or arylsulfonyloxy;

$R^1$ is hydrogen or lower alkyl of from one to three carbon atoms, inclusive;

$R^2$ is hydrogen, tetrahydrofuran-2-yl, tetrahydropyran-2-yl, 4-methoxytetrahydropyran-4-yl, or a carboxylic acyl group containing less than 12 carbon atoms;

$R^3$ is an oxo group of the group

in which $R^6$ is hydrogen, tetrahydrofuran-2-yl, tetrahydropyran-2yl, 4-methoxytetrahydropyran-4-yl, or a carboxylic acyl group containing less than 12 carbon atoms;

$R^4$ is hydrogen or methyl;

$R^5$ is hydrogen, lower alkyl of from 1 to 8 carbon atoms, inclusive, cycloalkyl, tetrahydrofuran-2-yl, tetrahydropyran-2-yl, 4-methoxytetrahydropyran-4-yl or a carboxylic acyl group containing less than 12 carbon atoms; and each Z is a carbon-carbon single bond or a carbon-carbon double bond;

and the C-3 ketals of the compounds of formulas (VI), (VII) and (IX) and the C-3 enol ethers of the compounds of formula (VI). Particularly important compounds selected from those depicted above are those wherein R is tetrahydropyran-2-yloxy or chloro and those thereof of Formulas (VI) and (VII).

As starting compounds, the tetrahydrofuran-2-yloxy, tetrahydropyran-2-yloxy, and 4-methoxytetrahydropyran-4-yloxy ethers of the 17α-(3-hydroxypropynyl) steroid compounds are prepared by treating the corresponding 17-oxo steroid with the Grignard reagent prepared upon treatment of the reaction product of propargyl alcohol and dihydrofuran, dihydropyran, and 4-methoxy-5,6-dihydro-2H-pyran (3-tetrahydrofuran2′-yloxypropyne, 3-tetrahydropyran-2′-yloxypropyne, and 3-(4′-methoxytetrahydropyran-4′-yloxy)propyne, respectively) with ethyl magnesium bromide in the manner known per se. In this manner, the corresponding 17α-(3-tetrahydrofuran-2′-yloxypropynyl), 17α-(3-tetrahydropyran-2′-yloxypropynyl), and 17α-(3-(4′-methoxytetrahydropyran-4′-yloxy)propynyl) steroid starting compounds are prepared.

The starting steroid compounds of the present invention which contain a 17α-(3-halopropynyl) grouping are prepared from the corresponding 17α-(3-hydroxypropynyl) compounds which are obtained from the ethers thereof (prepared as described above) upon conventional hydrolysis, such as with a mineral or organic acid. This halogenation-replacement conversion is accomplished in the bromo and chloro series by treatment of the hydroxy compound with thionyl bromide or phosphorus pentabromide or with thionyl chloride or phosphorus pentachloride in the presence of a tertiary amine base, such as the tertiary alkyl amines, pyridine, lutidine, and so forth. The reaction is carried out in any convenient order or fashion and at temperatures of from about 0° to about 20°C. and, conveniently, in organic liquid reaction medium, such as ether, benzene, and the like. See Preparation 19 hereof for preparation of the iodo compounds. Alternatively, the bromo and chloro derivatives can be prepared by treating the hydroxy compound with triphenylphosphine and carbon tetrabromide or carbon tetrachloride in organic reaction medium, such as dimethylformamide and dioxane, at about 110°C. for a few minutes followed by the usual recovery procedures.

In the fluoro series, the hydroxy compound is treated with a hydrocarbon sulfonyl fluoride including benzyl sulfonyl fluoride, tosyl fluoride and mesyl fluoride. This process also preferably employs an inert hydrocarbon solvent, such as hexane, heptane, benzene, toluene or an esterified or etherified alcohol, such as dimethoxyglycol. Other suitable solvents are chloroform and nitromethane. The reaction is carried out at temperatures of from 0° to about 150°C. for from one to about eight hours.

Alternatively, the 3-fluoropropynyl compounds are prepared by treating the 3-hydroxypropynyl compounds with 1-diethylamino-1,1,2-trifluoro-2- chloroethane in methylene chloride, acetonitrile, diethyl ether, dioxane, tetrahydrofuran, and the like, in the method known per se. see U.S. Pat. No. 3,444,188, for example.

The 17α-(3-arylsulfonyloxypropynyl) and 17α-(3-alkylsulfonyloxypropynyl) starting compounds hereof are likewise prepared from the 17α-(3-hydroxypropnyl) compounds upon treatment of the latter with an arylsulfonyl chloride or alkylsulfonyl chloride, respectively. This reaction is conveniently conducted in pyridine and at or about room temperature. Suitable arylsulfonyl chlorides for this purpose include 4-toluenesulfonyl chloride, benzenesulfonyl chloride, 4-bromobenzenesulfonyl chloride, 4-chlorobenzenesulfonyl chloride, 2-nitro-4-chlorobenzenesulfonyl chloride, mesitylenesulfonyl chloride, 4-methoxybenzenesulfonyl chloride, 2-naphthalenesulfonyl chloride, 2,4,5-trichlorobenzenesulfonyl chloride, and the like. Suitable alkylsulfonyl chlorides include methanesulfonyl chloride, 3-chloropropanesulfonyl chloride, 1-hexadecanesulfonyl chloride, and the like.

The 17α-(3-hydroxypropynyl) steroid compound from which the 3-halopropynyl derivatives are prepared are, in turn, prepared via several methods. In one such method, Grignard reagent is prepared upon treatment of the product of the reaction of propargyl alcohol and dihydropyran, 3-(tetrahydropyran-2′-yloxypropyne), with magnesium and ethyl bromide in the method known per se. This reagent is then reacted with a 17-oxo steroid. In this manner, the corresponding 17α-(3-tetrahydropyran-2′-yloxypropynyl) steroidal derivative is prepared. Thereafter, the thus formed derivative is conventionally hydrolyzed such as with a mineral or organic acid to hydrolyze the tetrahydropyran-2′-yloxy group forming the hydroxyl.

An alternative method for the preparation of the 3-hydroxy propynyl compounds hereof, which method is particularly useful in the estrogen series, involves ethynylating a 17-oxo starting compound via the method known per se, that is, through treatment with potassium acetylide to give the 17α-ethynyl-17β-hydroxy derivative. Thereafter, the 17β-hydroxy group is preferably protected before further reaction, such as by forming the tetrahydropyran-2-yloxy or tetrahydrofuran-2-yloxy ether thereof. In such further reaction, the ethynyl group is elaborated as respect the addition of the hydroxymethyl group as a replacement for the acidic hydrogen. This is accomplished by forming the ethynyl lithium salt (by treating the ethynyl derivative at room temperature with an equivalent amount of an ether solution of methyl, butyl, or phenyl lithium) and treating this with an equivalent or slight excess amount of paraformaldehyde at gentle reflux in ether followed by hydrolysis, all in accordance with the procedures described by Schaap et al., in Rec. Trav. Chim. 84, 1200 (1965) as well as the references cited therein.

The procedures for preparing the starting 3-halopropynyl steroids hereof are more completely described in, for example, U.S. Pat. No. 3,029,261.

In the preparation of the starting 17α-(3-substituted propynyl) derivatives in the 6,6-difluoroandrostene and -19-nor-androstene series, the foregoing preparations can be practiced upon the corresponding 6,6-difluoroandrost-4-ene-3,17-diones and 6,6-difluoro-19-norandrost-4-ene-3,17-diones and the 18-alkyl derivatives thereof. In practice, the 6,6-difluoro grouping is introduced into the precursor androst-4-ene-3,17-diones and 19-norandrost-4-ene-3,17-diones or 18-alkyl derivatives thereof. One method by which this is done is described in U.S. Pat. No. 3,219,673. This method involves treating a 3-acyloxy-5-fluoro-6-keto steroid (which are known or can be prepared as described in the cited patent and its references) with sulfur tetrafluoride to prepare the corresponding 3-acyloxy-5,6,6-trifluoro steroid which is hydrolyzed to the 3-hydroxy-5,6,6-trifluoro compound. The latter compound is oxidized to the corresponding 3-keto-5,6,6-trifluoro derivative which is then treated with a dehydrofluorinating agent such as alumina to provide the 3-keto-$\Delta^4$-6,6-difluoro compound.

Another method by which these 6,6-difluoro steroids are prepared involves twice consecutively forming an enol ether and treating this with perchloryl fluoride. Thus, the starting androst-4-ene-3,17-dione is converted to its enol ether and it is treated with perchloryl fluoride to form the 3-keto-$\Delta^4$-6-fluoro derivative. The same procedure is followed with this compound to form the 3-keto-$\Delta^4$-6,6-difluoro products.

The starting 17α-(3-substituted propynyl) compounds in the $\Delta^{4,9(10)}$-estradiene, $\Delta^{5(10),9(11)}$-estradiene, and $\Delta^{4,9(10),11}$-estratriene series are prepared from the corresponding 17-oxo compounds as described above. The $\Delta^{4,9(10),11}$-estratriene-17-one compounds are known and can be prepared by treating a 3-keto-$\Delta^{5(10)}$ steroid with bromine in pyridine solution to form the corresponding 3-keto-$\Delta^{4,9(10)}$-diene, ketalizing the resulting diene to the corresponding 3-ketal-$\Delta^{5(10),9(11)}$-diene, epoxidizing this ketal diene with a peroxy acid, and treating the epoxidized product with strong acid.

Alternatively, a 3-keto-$\Delta^{4,9(10)}$ is treated with hydrogen chloride in methanol at room temperature to obtain the corresponding 3,3-dimethoxy-$\Delta^{5(10),9(11)}$ compound which is hydrolyzed to give the 3-keto-$\Delta^{5(10),9(11)}$ compound. This compound is then converted to the 3-keto-$\Delta^{4,9(10)}$ and thence to the 3-keto-$\Delta^{4,9(10),11}$ compound as described above. See Steroids 8:1, p. 87 (July 1966) and U.S. Pat. Nos. 3,282,785 and 3,461,118, the subject matter of which is hereby incorporated by reference. The 17-oxo compounds in the $\Delta^{4,9(10)}$, $\Delta^{5(10),9(11)}$ and $\Delta^{4,9(10),11}$ series are reduced such as with lithium tri-t-butoxy aluminum hydride to form the 3,17-diol. This is acylated and the 3-acylate-17-ol separated by chromatography. The 17-alcohol is then oxidized such as with chromic acid to provide the 17-one compound which is elaborated as described above.

Alternatively, the 3-keto-17β-ol compound can be protected by formation of the 3,3-ketal followed by oxidation of the 17β-ol, with Collins reagent.

In the preferred embodiments, the desired non-interfering elaborative groupings at the other optional sites of the molecule are introduced prior to the novel, principal reaction hereof. Protection is preferably provided for those groups which may compete or interfere with the principal reaction hereof or with the processes preparative to the principal reaction hereof. Examples of such protection include forming the ketal or enol ethers of the 3-oxo functions which can be restored later in the synthetic sequence. Alternatively, and in the preferred embodiments, the 3-keto function is left unprotected and the resultant 3β-hydroxy is back-oxidized. such as with chromic acid in pyridine, manganese dioxide, etc. In the preferred embodiments, the principal reaction hereof is performed upon the 17β-hydroxy (or an ester thereof) starting compounds.

In the estrogen series, treatment of, for example, the 17α-ethynyl-3,17β-diol derivative with an appropriate carboxylic acid anhydride, such as acetic anhydride, in pyridine yields the 3-acyloxy-17β-hydroxy derivative selectively. Use of an acid anhydride in the presence of the corresponding acid and an acid catalyst, such as p-toluenesulfonic acid yields the 3,17β-diacyloxy derivative. This diester may then be selectively saponified as through the use of methanolic potassium bicarbonate to yield the corresponding 3-hydroxy-17β-acyloxy derivative. Similarly, etherification may be performed via the conventional procedures. Thus, treatment with dihydropyran in the presence of an acid catalyst such as p-toluenesulfonic acid, p-toluenesulfonyl chloride, dinitrobenzenesulfonic acid, or the like, yields the corresponding tetrahydropyran-2-yloxy derivative. Formation of the mono-tetrahydropyranyl ether may be accomplished by selective protection of other hydroxy groups as through ester formation, in the manner described above, with alkaline hydrolysis of such ester groups after formation of the ether, if desired. Formation of 3-methoxy derivatives may likewise be realized through the use of dimethylsulfate and potassium hydroxide in the conventional manner.

Similar conventional esterification and etherification procedures can be employed in the other series of starting compounds for the present invention. For example, in the preparation of the 3β,17β-diacylate starting materials for the process hereof, the 3,17-dioxo compound can be reduced and acylated with about one chemical equivalent of acylating agent. The product mixture is then chromatographed to separate the 3β-acylate-17β-ol compound. This derivative is then oxidized to the 3β-acylate-17-oxo compound. The Grignard method of introducing the etherified propynyl group at C-17α, as described above, is then followed including the addition of the appropriate acylating before work-up to form the 3β,17β-diacylate-17α-etherified propynyl compound. These compounds are utilized as starting compounds or are converted to the other 17α-(3-substituted propynyl) starting compounds hereof.

The 3β,17β-diethers can be conveniently formed by initially preparing the 3β,17β-diethers and following this with the formaldehyde method of preparing the 17α-(hydroxy-propynyl) compounds, as described above. These compounds can then be etherified with dihydrofuran, dihydropyran, or 4-methoxy-5,6-dihydro-2H-pyran.

If a mixed ester-ether compound is desired, the monoether is prepared in a sequence similar to that used for preparing the mono-acylate. Thereafter, the described Grignard method is followed ending with an acylation before work-up. Alternatively, the mono-acylate, prepared as described above, can be ethynylated at C-17α and the C-17β hydroxyl etherefied. Thereafter, the described formaldehyde method is employed for the preparation of the corresponding 17α-(hydroxypropynyl) compound which can be etherified as described above.

In the present specification and claims, the term "carboxylic acyl group" and "carboxylic acyloxy group" denote acyl and acyloxy groups which contain less than 12 carbon atoms and which can be of a straight, branched, or cyclic chain structure. This structure can further be saturated, unsaturated or aromatic and optionally substituted by functional groups, such as hydroxy, alkoxy containing up to five carbon atoms, acyloxy containing up to 12 carbon atoms, nitro, amino, halogeno, and the like. Representative esters thus include acetate, propionate, enanthate, benzoate, trimethylacetate, t-butylacetate, phenoxyacetate, cyclopentylpropionate, aminoacetate, β-chloropropionate, adamantoate, bicyclo[2.2.2] octane-1-carboxylate, bicyclo[2.2.2]oct-2-ene-1-carboxylate, 4-methylbicyclo[2.2.2]oct-2-ene-1-carboxylate, and so forth. The "lower alkyl" group in the present specification and claims can be of straight or branched chain structure. Representative alkyl groups include methyl, ethyl, isopropyl, n-butyl, t-butyl, n-hexyl, n-heptyl, n-octyl, isooctyl, and the like. In the present specification and claims, the term "cycloalkyl group" which is represented above by $R^5$ include, for example, cyclopentyl, cyclohexyl, and the like, and in general, contain from three to eight carbon atoms. In the present specification and claims, the term "3-halopropynyl" includes 3-bromopropynyl, 3-chloropropynyl, and 3-iodopropynyl, and 3-fluoropropynyl, preferably 3-chloropropynyl.

The "alkylsulfonyloxy" grouping hereof is one wherein the alkyl group is as defined above, preferably containing from 1 to 6 carbon atoms inclusive. The alkyl group can also be substituted, notably with halogen. The arylsulfonyloxy grouping hereof is one wherein the aryl group is naphthyl, phenyl or a mono or poly substituted phenyl, the substituents being selected from alkyl, alkoxy, halogeno, nitro, and the like.

The following preparations and examples serve to further illustrate the manner by which the present invention can be practiced. As such, however, they should not be construed as limitations upon the overall scope hereof.

Preparation 1

A solution is prepared by dispersing 29 grams of estr-4-ene-3,17-dione in 600 ml. of dioxane at room temperature with stirring. Ethyl orthoformate (60 ml) and 1.8 grams of p-toluenesulfonic acid hydrate are added to the resultant mixture. The addition is conducted portionwise with stirring, and at room temperature. After the addition is complete, the resulting reaction mixture is allowed to stand at room temperature for three and one half hours. After this time, the resulting solution is poured into two liters of ice water. After this has been accomplished, the whole mixture is filtered to yield a crystalline material which is recrystallized from methylene chloride: methanol containing a few drops of pyridine to obtain the desired 3-ethoxyestra-3,5-dien-17-one product.

Propargyl alcohol (42 grams) is dispersed in 63 grams of 2,3-dihydropyran with stirring. While continuing the stirring at room temperature, phosphorus oxychloride (500 mg) is added portionwise to the resultant solution. The reaction mixture rapidly becomes warm and is cooled intermitently in ice. After maintaining these conditions for two hours and then allowing the temperature of the reaction mixture of stabilize at room temperature, an aqueous solution of potassium hydroxide is added. The mixture is then extracted with ether and the ether extracts distilled under gradually increasing temperatures and gradually decreasing pressures to obtain the 3-tetrahydropyran-2'-yloxypropyne product.

The corresponding 3-tetrahydrofuran-2'-yloxypropyne and 3-(4'-methoxytetrahydropyran-4'-yloxy)propyne products are similarly prepared upon substitution of 2,3-dihydrofuran and 4-methoxy-5,6-dihydro-2H-pyran for 2,3-dihydropyran.

To 12 g. of tetrahydropyran-2'-yloxypropyne are added 100 ml. of anhydrous tetrahydrofuran and 35 ml. of ethyl magnesium bromide. The reaction mixture is refluxed for 5 minutes and left at room temperature for 2 hours. Then, 10 g. of 3-ethoxyestra-3,5-dien-17-one in 150 ml. of anhydrous tetrahydrofuran are added, and the reaction mixture is kept at room temperature for 2 hours. It is then poured into a saturated ammonium chloride solution and extracted with methylene chloride, washed with water, dried and evaporated to dryness to yield 3-ethoxy-17α-(3-tetrahydropyran-2'-yloxypropynyl)-estra-3,5-dien-17β-ol.

In like manner are prepared 3-ethoxy-17α-(3-tetrahydrofuran-2'-yloxypropynyl)-estra-3,5-dien-17β-ol, and 3-ethoxy-17α-(3-(4'-methoxytetrahydropyran-4'-yloxy)propynyl)-estra-3,5-dien-17β-ol. The foregoing can be similarly practiced upon the other compounds of this invention to prepare the corresponding 17α-(3-tetrahydrofuran-2'-yloxypropynyl), 17α-(3-tetrahydropyran-2'-yloxypropynyl), and 17α-(3-(4'-methoxytetrahydropyran-4'-yloxy)propynyl starting compounds hereof.

If, after the reaction period above described, the reaction mixture is cooled in ice water and then mixed with 50 ml. of acetic anhydride and left at room temperature for 16 hours followed by the work-up as described, a 17α-(3-tetrahydropyran-2'-yloxypropynyl)-17β-acetoxyestr-4-en-3-one is prepared.

Under anhydrous conditions, 3.2 g. of magnesium, 11 ml. of ethyl bromide, and 150 ml. of absolute ether are mixed together at room temperature. To the resulting solution is added, dropwise and at room temperature, 30 g. of 3-tetrahydropyran-2'-yloxypropyne product obtained as described above. The temperature of the resulting mixture is heated to the boiling point and maintained under reflux conditions for 5 minutes. After this time, the mixture is cooled to room temperature and mixed dropwise with a solution containing 21 grams of 3-ethoxy-estra-3,5-dien-17-one which is dispersed in 200 ml. of tetrahydrofuran. After this addition is complete, the reaction mixture is stirred at room temperature for a period of two hours. The resulting solution is cooled in an icebath and then mixed with 70 ml. of acetic anhydride. This solution is then left at room temperature for 16 hours. After this, the mixture is poured into an ammonium chloride:ice solution and this is then extracted with ether, the ether extracts being dried and evaporated to a concentrated form. The concentrate is chromatographed to obtain a crystalline product which is crystallized from ethyl acetate:hexane:petroleum ether. Recrystallization from the same solvent mixtures obtains the desired 17α-(3-tetrahydropyran-2'-yloxypropynyl)-17β-acetoxyestr-4-en-3-one product.

Preparation 2

3-Ethoxy-17α-(3-tetrahydropyran-2'-yloxypropynyl)-estra-3,5-dien-17β-ol (18 g.) is dissolved in 750 ml. of methanol at room temperature. Thereafter, 20 g. of oxalic acid is dispersed in 150 ml. of water and the resultant aqueous oxalic acid solution is added to the steroid methanol solution at room temperature in a portionwise fashion. The resulting reaction mixture is left overnight at room temperature. The reaction mixture is then neutralized by the portionwise addition of sodium hydroxide and the neutralized mixture is filtered. The filtrate is concentrated in vacuum to a residue. The residue is extracted with an ether:methylene chloride mixture to provide a solution which is then dried over sodium sulfate. The dried solution is evaporated to obtain a solid. The solid is chromatographed on a column of silica gel eluting with hexane:ethyl acetate to obtain a substance which is recrystallized from ethyl acetate:hexane to obtain the 17α-(3-hydroxypropynyl)-estr-4-en-17β-ol-3-one product.

17α-(3-Tetrahydropyran-2'-yloxypropynyl)-17β-acetoxy-estr-4-en-3-one (18 g.) is dissolved in 750 ml. of methanol at room temperature. Thereafter, 20 g. of oxalic acid is dispersed in 150 ml. of water and the resultant aqueous oxalic acid solution is added to the steroid methanol solution at room temperature in a portionwise fashion. The resulting reaction mixture is left overnight at room temperature. The reaction mixture is then neutralized by the portionwise addition of sodium hydroxide and then the neutralized mixture is filtered. The filtrate is concentrated in vacuum to a residue. The residue is extracted with an ether:methylene chloride mixture to provide a solution which is then dried over sodium sulfate. The dried solution is evaporated to obtain a solid. The solid is chromatographed on a column of silica gel eluting with hexane:ethyl acetate (1:1) to obtain a substance which is recrystallized from ethyl acetate: hexane to obtain the 17α-(3-hydroxypropynyl)-17β-acetoxy-estr-4-en-3-one product as a crystalline solid.

Preparation 3

A mixture of 20 ml. of absolute pyridine, 8 ml. of freshly distilled thionyl chloride, and 90 ml. of absolute tetrahydrofuran is prepared at room temperature with stirring. 17α-(3-Hydroxypropynyl)-estr-4-en-17β-ol-3-one (3.4 g.) which is dissolved in 50 ml. of anhydrous tetrahydrofuran are added to the resulting solution over a 25 minute period at room temperature. After the addition is complete, the reaction mixture is stirred at room temperature for 35 minutes. After this period of time, the mixture is poured into ice water and the resulting mixture is extracted with ether:methylene chloride. The extracts are washed with water and dried over sodium sulfate. The dried material is evaporated to an oil. The oil is chromatographed on silica gel to obtain the desired 17α-(3-chloropropynyl)-estr-4-en-17β-ol-3-one product.

A mixture of 20 ml. of absolute pyridine, 8 ml. of freshly distilled thionyl chloride, and 90 ml. of absolute tetrahydrofuran is prepared at room temperature with stirring. 17α-(3-Hydroxypropynyl)-17β-acetoxyestr-4-en-3-one (3.4 g.) which is dissolved in 50 ml. of anhydrous tetrahydrofuran is added to the resulting solution over a 25 minute period at room temperature. After the addition is complete, the reaction mixture is stirred at room temperature for 35 minutes. After this period of time, the mixture is poured into ice water and the resulting mixture is extracted with ether:methylene chloride. The extracts are washed with water and dried over sodium sulfate. The dried material is evaporated to an oil. The oil is chromatographed on silica gel to obtain the desired 17α-(3-chloropropynyl)-17β-acetoxyestr-4-en-3-one product.

In like manner, the foregoing procedures can be practiced on the corresponding 18-alkyl compounds thus providing as final compounds, 17α-(3-chloropropynyl)-18-methylestr-4-en-17β-ol-3-one, 17-α-(3-chloropropynyl)-18-ethylestr 4-en-17β-ol-3-one, 17α-(3-chloropropynyl)-18-n-propylestr-4-en-17β-ol-3-one.

Preparation 4

To a slurry of 1.0 g. of sodium hydride in 10 ml. of dry diethyleneglycol dimethyl ether under a dry nitrogen atmosphere is slowly added 1.0 g. of 3-methoxy-17α-ethynyl-estra-1,3,5(10) -trien-17β-ol in 10 ml. of dry diethyleneglycol dimethyl ether in a dropwise fashion over 20 minute period. To this mixture is added dropwise, 0.9 g. of 2-chlorotetrahydropyran over a 10 minute period.

The mixture is stirred at room temperature for an additional 30 minutes and then cautiously added to an ice water mixture with stirring. The organic phase is extracted with diethyl ether, dried and evaporated under reduced pressure to yield 3-methoxy-17α-ethynyl-17β-tetrahydropyran-2'-yloxyestra-1,3,5(10)-triene which may be further purified via recrystallization from acetone:hexane.

A solution of 2.5 grams of phenyllithium in 25 ml. of diethyl ether is prepared. While maintaining this solution at room temperature, 10 grams of 3-methoxy-17α-ethynyl-17β-tetrahydropyran-2'-yloxyestra-1,3,5(10)-triene are added thereto to provide a solution containing 3-methoxy-17α-ethynyllithium-17β-tetrahydropyran-2'-yloxyestra-1,3,5(10)-triene. To the resulting solution is added, portionwise and with stirring, 4 grams of paraformaldehyde. The addition is conducted at a rate to maintain gentle reflux of the solution. After the addition, the mixture is stirred for 20 hours, and then poured into water and extracted with ether. The ether extracts are washed with water, dried and evaporated to obtain the 3-methoxy-17α-(3-hydroxypropynyl)-17β-tetrahydropyran-2'-yloxyestra-1,3,5(10)-triene product.

3-Methoxy-17α-(3-hydroxypropynyl)-17β-tetrahydropyran-2'-yloxyestra-1,3,5(10)-triene (1 g.) is dispersed in 50 ml. of anhydrous ether at room temperature with stirring. To the resultant solution is added 1.5 ml. of purified thionyl chloride. The addition is conducted portionwise at 0°C. The resulting reaction mixture is then allowed to stand at 0°C. for a period of 6 minutes after which time it is washed with aqueous sodium bicarbonate solution followed by water. The washed material is then dried over sodium sulfate and evaporated to dryness to obtain the 3-methoxy-17α-(3-chloropropynyl)-17β-tetrahydropyran-2'-yloxyestra-1,3,5(10)-triene product which is recrystallized from ether-ethyl acetate.

Alternatively, the 17α-(3-chloropropynyl) compound is prepared as described in Preparation 5.

To a solution of 1 g. of 3-methoxy-17α-(3-chloropropynyl)-17β-tetrahydropyran-2'-yloxyestra-1,3,5(10) -triene in 30 ml. of dioxane is added 0.5 ml. of 2 N hydrochloric acid. The mixture is allowed to stand 5 hours at room temperature and then diluted with ice water and extracted with methylene chloride. The extracts are washed with water to neutrality dried over sodium sulfate, and evaporated to dryness to yield 3-methoxy-17α-(3-chloropropynyl)-estra-1,3,5(10) -trien-17β-ol which is recrystallized from acetone:hexane.

Preparation 5

Alternative to the procedures described in Preparations 3 and 4 the following can be employed to prepare the 3-chloropropynyl compounds:

A solution of 17α-(3-hydroxypropynyl)-17β-acetoxyestr-4-en-3-one (3.5 g.) and triphenylphosphine (4.2 g.) in dimethylformamide (26.7 ml.) containing carbon tetrachloride (1.1 ml.) is heated at 110° for 15 minutes and then the solvent is evaporated under reduced pressure. The residue is dissolved in hexane-ether (3:1) and chromatographed on 140 g. of silica gel. Elution with etherhexane (2:1) and crystallization of the pooled crystalline fractions from hexane furnishes 17α-(3-chloropropynyl)-17β-acetoxyestr-4-en-3-one.

In accordance with the above procedure, 17α-(3-chloropropynyl)-estr-4-en-17β-ol-3-one is prepared from 17α-(3-hydroxypropynyl)-estr-4-en-17β-ol-3-one.

Similarly, 17α-(3-chloropropynyl)-17β-acetoxyestr-18-methylestr-4-en-3-one, 6,6-difluoro-17α-(3-chloropropynyl)-17β-acetoxyestr-4-en-3-one, and 6,6-difluoro-17α-(3-chloropropynyl)-17β-acetoxy-18-methylestr-4-en-3-one are prepared. Base hydrolysis thereof affords the corresponding 17β-ols, or the chlorination can be performed on the 17β-ol.

Preparation 6

17α-(3-Hydroxypropynyl)-estr-4-en-17β-ol-3-one (1.5 g.) is dissolved in 75 ml. of toluene. The resulting solution is mixed with 2 g. of benzene sulfonyl fluoride. The reaction mixture is then heated to a temperature ranging from 80° to 90°C. and for a period of 4 hours. At the end of this reaction period, the mixture is cooled and then poured into ice water. The organic layer is then washed with a sodium bicarbonate solution and then with water and, following the washings, is dried over sodium sulfate. Solvent is then removed by evaporation and the remaining residue is recrystallized from ether to obtain the 17α-(3-fluoropropynyl)-estr-4-en-17β-ol-3-one product.

Alternatively, the 3-fluoropropynyl compounds, prepared as described above, are prepared by the following representative procedure:

A solution of 1 g. of 17α-(3-hydroxypropynyl)-17β-acetoxyestr-4-en-3-one in 100 ml. of anhydrous methylene dichloride and 1 g. of 1-diethylamino-1,1,2-trifluoro-2-chloroethane is allowed to stand at room temperature for 48 hours. The reaction mixture is then filtered through alumina, eluting with hexane, to give 17-α-(3-fluoropropynyl)-17β-acetoxyestr-4-en-3-one which can be recrystallized from acetone:hexane.

Alternatively, the above method is practiced in acetonitrile at room temperature for about 24 hours or with tetrahydrofuran at reflux for about 1 hour.

Preparation 7

A solution of 3-tetrahydropyran-2'-yloxyprop-1-yne (12.0 g.) in dry tetrahydrofuran (100 ml.) is added to a solution of ethylmagnesium bromide prepared from ethyl bromide (8.2 g.) and magnesium turnings (1.8 g.) in tetrahydrofuran (150 ml.). The reaction mixture is heated under reflux for 5 minutes and after being allowed to stand at room temperature for 2 hours it is treated with a solution of 3-ethoxyestra-3,5-dien-17-one (10.0 g.) dissolved in dry tetrahydrofuran (150 ml.). After 2 hours, the reaction mixture is poured into saturated ammonium chloride solution and the 3-ethoxy-17α-(3-tetrahydropyran-2'-yloxypropynyl)-estra-3,5-dien-17β-ol product is isolated by extraction with methylene dichloride.

A solution of 3-tetrahydropyran-2'-yloxyprop-1-yne (7.1 g.) in dry tetrahydrofuran (50 ml.) is added to a solution of ethylmagnesium bromide prepared from ethyl bromide (4.0 g.) and magnesium turnings (0.9 g.) in tetrahydrofuran (75 ml.). The reaction mixture is heated under reflux for 5 minutes and after being allowed to stand at room temperature for 30 minutes it is treated with a solution of 3-ethoxyestra-3,5-dien-17-one (5.0 g.) in dry tetrahydrofuran (65 ml.). After 8 hours, acetyl chloride (20 ml.) is added and the reaction mixture is kept at room temperature for 18 hours and then poured into water. The crude product, isolated by extraction with methylene dichloride, is dissolved in methanol (15 ml.) containing 0.25 ml of concentrated hydrochloric acid and the resulting solution heated under reflux for 10 minutes. Addition of water (200 ml.) and isolation by extraction with methylene dichloride furnishes a crystalline solid which is purified by chromatography over Florisil (200 g.) Elution with ethyl acetate-hexane (1:4) gives 17α-(3-hydroxypropynyl)-17β-acetoxyestr-4-en-3-one after crystalline from ether.

The thus prepared compound is treated in accordance with the chlorination procedures of Preparation 3 or Preparation 5 to give 17α-(3-chloropropynyl)-17β-acetoxy-estr-4-en-3-one. In a similar manner, but with elimination of the acetyl chloride treatment step, 17α-(3-chloropropynyl)-estr-4-en-17β-ol-3-one is prepared.

In accordance with the above procedures, 17α-(3-chloropropynyl)-17β-acetoxy-18-methylestr-4-en-3-one, 17α-(3-chloropropynyl)-18-methylester-4-en-17β-ol-3-one, 6,6-difluoro-17α-(3-chloropropynyl)-17β-acetoxyestr-4-en-3-one, 6,6-difluoro-17α-(3-chloropropynyl)-4-en-17β-ol-3-one, 6,6-difluoro-17α-(3-chloropropynyl)-17β-acetoxy-18-methylestr-4-en-3-one, 6,6-difluoro-17α-(3-chloropropynyl)-18-methylestr-4-en-17β-ol-3-one are prepared from the respective starting compounds. The 17β-ol compounds can also be prepared upon final base hydrolysis of the 17β-acetate products.

Preparation 8

17α(3-Bromopropynyl)-androst-4-en-17β-ol-3-one is prepared by substituting thionyl bromide for thionyl chloride in Preparation 3 and by substituting carbon tetrabromide for carbon tetrachloride in Preparation 5. This can be acetylated to the 17β-acetate. Likewise, by employing the appropriate starting compounds, the corresponding 18-methyl, -ethyl, and -propyl derivatives are prepared. Similarly, these procedures are applicable in the preparation of the 17α-(bromopropynyl) derivatives in the estrogen and estrane series.

Preparation 9

A mixture of 1 g. of 17α-(3-hydroxypropynyl)-17β-acetoxyestr-4-en-3-one in 5 ml. of pyridine and 0.5 g. of methanesulfonyl chloride is allowed to stand at room temperature for 24 hours and is then diluted with water and filtered. The solid thus collected is dried and recrystallized from acetone:hexane to yield 17α-(3-methylsulfonyloxypropynyl)-17β-acetoxyestr-4-en-3-one.

Similarly, 17α-(3-p-tolylsulfonyloxypropynyl)-17β-acetoxyestr-4-en-3-one is prepared by substituting p-toluenesulfonyl chloride for methanesulfonyl chloride in the foregoing procedure. Likewise, the corresponding 17α-(3-methylsulfonyloxypropynyl) and 17α-(3-p-tolylsulfonyloxypropynyl) derivatives of the other 17α-(3-hydroxypropynyl) starting compounds of the present invention are prepared.

Also prepared are the corresponding 17β-(3-ethanesulfonyloxypropynyl), -(3-propanesulfonyloxypropynyl), -(3-benzenesulfonyloxy), and -(3-mesitylenesulfonyloxy) derivatives.

Preparation 10

A stream of perchloryl fluoride is passed through a solution of 1 g. of 3-ethoxyestra-3,5-dien-17-one in 25 ml. of dimethylformamide, cooled to 0°C., for 5 minutes. After being allowed to slowly attain a temperature of 20°C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to yield a mixture of the 6α-fluoro and 6β-fluoro isomers. To the mixture in 7.5 ml. of anhydrous, peroxide-free dioxane is added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6-fluoroestra-3,5-dien-17-one which is recrystallized from acetone:hexane.

A stream of perchloryl fluoride is passed through a solution of 1 g. of 3-ethoxy-6-fluoroestra-3,5-dien-17-one in 25 ml. of dimethylformamide, cooled to 0°C., for 5 minutes. After being allowed to slowly attain a temperature of 20°C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to provide 6,6-difluoro-estr-4-ene-3,17-dione product on recrystallization from acetone:hexane.

In like manner, 6,6-difluoroandrost-4-ene-3,17-dione, 6,6-difluoro-18-methylestr-4-ene-3,17-dione, 6,6-difluoro-18-methylandrost-4-ene-3,17-dione, 6,6-difluoro-18-ethylestr-4-ene-3,17-dione, 6,6-difluoro-18-ethylandrost-4-ene-3,17-dione, 6,6-difluoro-18-propylestr-4-ene-3,17-dione, and 6,6-difluoro-18-propylandrost-4-ene-3,17-dione are prepared from the respective starting compound.

Preparation 11

A mixture of 1 g. of 17β-acetoxyestr-4-en-3-one, 25 ml. of dry benzene, 5 ml. of ethylene glycol, and 50 mg. of p-toluenesulfonic acid monohydrate is refluxed for 16 hours using a water separator. The reaction mixture is then washed with aqueous sodium bicarbonate solution and water, dried and evaporated to dryness. The resultant residue is chromatographed on alumina eluting with hexane:benzene and pure benzene to yield 3,3-ethylenedioxy-17β-acetoxyestr-5(10)-ene which is recrystallized from acetone:hexane.

To a solution of 1.0 g. of 3,3-ethylenedioxy-17β-acetoxyestr-5(10)-ene in 50 ml. of benzene is added 0.2 g. of magnesium sulfate. The mixture is heated at reflux for 40 minutes, neutralized with a saturated aqueous sodium carbonate solution, concentrated under reduced pressure to about 20 ml. and poured into water. The solid which forms is collected by filtration, washed well with water, and dried to yield 17α-acetoxyestr-5(10)-en-3-one which may be recrystallized from acetone.

One gram of 3,3-ethylenedioxy-17β-acetoxyestr-5(10)-ene is disposed in 45 ml. of acetone containing 0.05 mg. of malonic acid in 5 ml. of water and the resultant mixture is allowed to stand at room temperature overnight. After this time it is poured into dilute aqueous potassium bicarbonate solution and extracted with ether. The extracts are dried and evaporated to give 17-β-acetoxyestr-5(10)-en-3-one.

To a solution of 0.2 g. of 17β-acetoxyestr-5(10)-en-3-one in 4 ml. of pyridine is added 1.1 g. of pyridine perbromide hydrobromide. The mixture is stirred at room temperature for 7 hours after which time it is partitioned between water and ethyl acetate and the organic phase separated. This is washed successively with dilute hydrochloric acid, dilute sodium bicarbonate solution, dried and evaporated. The resultant solid is chromatographed on alumina eluting with benzene:ether and pure benzene to give 17β-acetoxyestra-4,9(10)-dien-3-one.

A solution of 1 g. of 17β-acetoxyestra-4,9(10)-dien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield estra-4,9(10)-dien-17β-ol-3-one which is recrystallized from methylene chloride:ether.

A solution of 6 g. of estra-4,9(10)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through water, dried and evaporated to dryness to yield estra-4,9(10)-diene-3,17-dione which may be further purified by recrystallization from acetone:hexane.

Likewise, 18-methylestra-4,9(10)-diene-3,17-dione, 18-ethylestra-4,9(10)-diene-3,20-dione, and 18-propylestra-4,9(10)-diene-3,17-dione are prepared.

Estra-4,9(10)-dien-17β-ol-3-one (2 g.) is added to a solution of hydrogen chloride (1 g.) in methanol (100 ml.). After 15 minutes at room temperature, the solution is cooled in ice and is neutralized with powdered sodium methoxide. Methylene chloride (300 ml.) is then added and the mixture is washed several times with water. The dried solvent is evaporated and the residual gum is exhaustively extracted with boiling n-hexane. The extract is chromatographed on Florisil (50 g.). The column is eluted with 1%, 2%, 3%, and 4% acetone in petroleum ether (b.p. 30°–60°). The gum eluted in the latter is dissolved in acetone (40 ml.) and the solution is treated with sulfuric acid (0.5 ml.; 8%). After 5 minutes, the mixture is diluted with water and the crystals which separate are collected, washed with water, and dried. Recrystallization from n-hexane gives the estra-5(10),9(11)-dien-17β-ol-3-one.

A solution of 6 g. of estra-5(10),9(11)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield estra-5(10),9(11)-diene-3,17-dione which may be further purified by recrystallization from acetone:hexane.

Likewise 18-methylestra-5(10),9(11)-diene-3,17-dione, 18-ethylestra-5(10),9(11)-diene-3,17-dione, and 18-propylestra-5(10),9(11)-diene-3,17-dione are prepared.

A mixture of 2.0 g. of estra-4,9(10)-diene-3,17-dione, 100 ml. of dry benzene, 10 ml. of ethylene glycol and 250 mg. of p-toluenesulfonic acid monohydrate is refluxed under nitrogen for 6 hours. The reaction mixture is then washed with benzene, aqueous sodium bicarbonate solution, and water, dried and evaporated to dryness to yield 3,3;17,17-bisethylenedioxyestra-5(10),9(11)-diene which is recrystallized from acetone:hexane.

The above procedure is repeated using estra-4,9(10)-dien-17β-ol-3-one to give 3,3-ethylenedioxyestra-5(10),9(11)-dien-17β-ol-3-one which is oxidized with Collins reagent as described above to give 3,3-ethylenedioxyestra-5(10),9(11)-dien-17-one.

To a solution of 1.75 g. of 3,3;17,17-bisethylenedioxyestra-5(10),9(11)-diene in 5 ml. of methylene chloride is added 1.2 g. of m-chloroperbenzoic acid. The reaction mixture is kept at room temperature for 20 minutes. The mixture is then extracted with methylene chloride, the extracts washed with dilute sodium bicarbonate solution and water, and evaporated to yield an oil.

The oil thus obtained is chromatographed on silica with 1:1 ethyl acetate:hexane and treated at 25°C. with 0.05 ml. of perchloric acid (70%) for 20 minutes. Isolation via chromatography yields estra-4,9(10),11-triene-3,17-dione.

Similar results are obtained when perbenzoic acid is substituted for m-chloroperbenzoic acid in the epoxidation procedure. In like manner, sulfuric acid or other strong acid can be substituted in lieu of perchloric acid in the last procedure with successful results.

The oil obtained upon epoxidation as described above is alternately dissolved in 100 mg. of p-toluenesulfonic acid. The mixture is kept at room temperature for 20 hours and is then evaporated to an oily mixture containing the corresponding hydroxy derivatives. These latter derivatives may be isolated via chromatography or the oil may be treated with perchloric acid or other mineral acid as described above to similarly yield estra-4,9(10),11-triene-3,17-dione.

Likewise prepared by the procedures of this example is 18-methylestra-4,9(10),11-triene-3,17-dione.

A solution of 2 g. estra-4,9(10),11-triene-3,17-dione in 20 ml. of anhydrous tetrahydrofuran is cooled to −75°C. in a dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield estra-4,9(10),11-triene-3β,17β-diol.

A mixture of 1 g. of estra-4,9(10),11-triene-3β,17β-diol, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxyestra-4,9(10),11-trien-17β-ol which is recovered by chromatography on silica gel.

A solution of 6 g. of 3β-acetoxyestra-4,9(10),11-trien-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-acetoxyestra-4,9(10),11-trien-17-one which may be further purified by recrystallization from acetone:hexane.

Also thus prepared are 3β-acetoxy-18-methylestra-4,9-(10),11-trien-17-one and 3β-acetoxy-18-ethylestra-4,9(10),11-trien-17-one and 3β-acetoxy-18-propylestra-4,9(10),11-trien-17-one.

Preparation 12

A mixture of 1 g. of estra-4,9(10)-diene-3,17-dione, 7.5 ml. of dry benzene, 5 ml. of ethylene glycol and 2 g. of oxalic acid dihydrate is refluxed for 16 hours using a water separator. The reaction mixture is then washed with aqueous sodium bicarbonate solution and water, dried and evaporated to dryness to yield 3,3-ethylenedioxyestra-4,9(10)-dien-17-one which is recrystallized from acetone:hexane.

Alternatively, the above procedure can be employed using estra-4,9(10)-dien-17β-ol-3-one to give the 3,3-ethylene ketal followed by oxidation with Collins reagent to give 3,3-ethylenedioxyestra-4,9(10)-dien-17-one.

Likewise, 3,3-ethylenedioxy-18-methylestra-4,9(10)-dien-17-one, 3,3-ethylenedioxy-18-ethylestra-4,9(10)-dien-17-one, 3,3-ethylenedioxy-18-propylestra-4,9(10)-dien-17-one, 3,3-ethylenedioxyestra-5(10),9(11)-dien-17-one, 3,3-ethylenedioxy-18-methylestra-5(10),9(11)-dien-17-one, 3,3-ethylenedioxy-18-ethylestra-5(10),9(11)-dien-17-one, 3,3-ethylenedioxy-18-propylestra-5(10),9(11)-dien-17-one, 3,3-ethylenedioxyestra-4,9(10),11-trien-17-one, 3,3-ethylenedioxy-18-methylestra-4,9(10),11-trien-17-one, and 3,3-ethylenedioxy-18-ethylestra-4,9(10),11-trien-17-one are prepared from the respective starting compounds.

One gram of estra-4,9(10)-diene-3,17-dione is suspended in 10 ml. of anhydrous methanol containing 0.16 ml. of perchloric acid (70%) per liter of methanol. The reaction mixture is stirred at room temperature and under anhydrous conditions overnight. Solid sodium methoxide is then added and the reaction mixture is then slowly diluted with from 5 to 10 times its volume with water. The mixture is then filtered to give 3,3-dimethoxyestra-4,9(10)-dien-17-one.

Likewise, the 3,3-dimethoxy compounds otherwise corresponding to those listed in paragraph three hereof are prepared.

The compounds prepared as described in Preparations 11 and 12 are treated in accordance with the procedures of Preparations 1 to 9 to give:

17α-(3-tetrahydrofuran-2'-yloxypropynyl)estra-4,9(10),11-trien-17β-ol-3-one,

17α-(3-tetrahydrofuran-2'-yloxypropynyl)estra-4,9(10)-dien-17β-ol-3-one,

17α-(3-tetrahydrofuran-2'-yloxypropynyl)estra-5(10),9(11)-dien-17β-ol-3-one,

17α-(3-tetrahydropyran-2'-yloxypropynyl)estra-4,9(10),11-trien-17β-ol-3-one,

17α-(3-tetrahydropyran-2'-yloxypropynyl)estra-4,9(10)-dien-17β-ol-3-one,

17α-(3-tetrahydropyran-2'-yloxypropynyl)estra-5(10),9(11)-dien-17β-ol-3-one,

17α-(3-(4'-methoxytetrahydrofuran-4'-yloxy)propynyl) estra-4,9(10),11-trien-17β-ol-3-one, 17α-(3-(4'-methoxytetrahydrofuran-4'-yloxy)propynyl) estra-4,9(10)-dien-17β-ol-3-one, 17α-(3-(4'-methoxytetrahydrofuran-4'-yloxy)propynyl) estra-5(10),9(11)-dien-17β-ol-3-one, 17α-(3-tetrahydrofuran-2'-yloxypropynyl)-18-methylestra-4,9(10),11-trien-17β-ol-3-one, 17α-(3-tetrahydrofuran-2'-yloxypropynyl)-18-methyl-estra-4,9(10)-dien-17β-ol-3-one, 17α-(3-tetrahydrofuran-2'-yloxypropynyl)-18-methylestra-5(10),9(11)-dien-17β-ol-3-one, 17α-tetrahydropyran-2'-yloxypropynyl)-18-methylestra-4,9(10),11-trien-17β-ol-3-one, 17α-tetrahydropyran-2'-yloxypropynyl)-18-methylestra-4,9(10)-dien-17β-ol-3-one, 17α-tetrahydropyran-2'-yloxypropynyl)-18-methylestra-5(10)9(11)-dien-17β-ol-3-one, 17α-(3-(4'-methoxytetrahydropyran-4'-yloxy)propynyl)-18-methylestra-4,9(10),11-trien-17β-ol-3-one, 17α-(3-(4'-methoxytetrahydropyran-4'-yloxy)propynyl)-18-methylestra-4,9(10)-dien-17β-ol-3-one, 17α-(3-(4'-methoxytetrahydropyran-4'-yloxy)propynyl)-18-methylestra-5(10)9(11)-dien-17β-ol-3-one, 17α-(3-tetrahydrofuran-2'-yloxypropynyl)-18-ethylestra-4,9(10),11-trien-17β-ol-3-one, 17α-(3-tetrahydrofuran-2'-yloxypropynyl)-18-ethylestra-4,9(10)-dien-17β-ol-3-one, 17α-(3-tetrahydrofuran-2'-yloxypropynyl)-18-ethylestra-5(10)9(11)-dien-17β-ol-3-one, 17α-(3-tetrahydropyran-2'-yloxypropynyl)-18-ethylestra-4,9(10),11-trien-17β-ol-3-one, 17α-(3-tetrahydropyran-2'-yloxypropynyl)-18-ethylestra-4,9(10)-dien-17β-ol-3-one, 17α-(3-tetrahydropyran-2'-yloxypropynyl)-18-ethylestra-5(10)9(11)-dien-17β-ol-3-one, 17α-(3-(4'-methoxytetrahydropyran-4'-yloxy)propynyl)-18-ethylestra-4,9(10),11-trien-17β-ol-3-one, 17β-(3-(4'-methoxytetrahydropyran-4'-yloxy)propynyl)-18-ethylestra-4,9(10)-dien-17β-ol-3-one, 17α-(3-(40'-methoxytetrahydropyran-4'-yloxy)propynyl)-18-ethylestra-5(10)9(11)-dien-17β-ol-3-one, 17α-(3-tetrahydrofuran-2'-yloxypropynyl)-18-propylestra-4,9(10),11-trien-17β-ol-3-one, 17α-(3-tetrahydrofuran-2'-yloxypropynyl)-18-propylestra-4,9(10)-dien-17β-ol-3-one, 17α-(3-tetrahydrofuran-2'-yloxypropynyl)-18-propylestra-5(10)9(11)-dien-17β-ol-3-one, 17α-(3-tetrahydropyran-2'-yloxypropynyl)-18-propylestra-4,9(10),11-trien-17β-ol-3-one, 17α-(3-tetrahydropyran-2'-yloxypropynyl)-18-propylestra-4,9(10)-dien-17β-ol-3-one, 17α-(3-tetrahydropyran-2'-yloxypropynyl)-18-propylestra-5(10)9(11)-dien-17β-ol-3-one, 17α-(3-(4'-methoxytetrahydropyran-4'-yloxy)propynyl)-18-propylestra-4,9(10),11-trien-17β-ol-3-one, 17α-(3-(4'-methoxytetrahydropyran-4'-yloxy)propynyl)-18-propylestra-4,9(10)-dien-17β-ol-3-one, 17α-(3-(4'-methoxytetrahydropyran-4'-yloxy)propynyl)-18-propylestra-5(10)9(11)-dien-17β-ol-3-one.

17α-(3-halopropynyl)estra-4,9(10),11-trien-17β-ol-3-one,

17α-(3-halopropynyl)-estra-4,9(10)-dien-17β-ol-3-One,

17α-(3-halopropynyl)estra-5(10)9(11)-dien-17β-ol-3-one,

17α-(3-halopropynyl)-18-methylestra-4,9(10),11-trien-17β-ol-3-one,

17α-(3-halopropynyl)-18-methylestra-4,9(10)-dien-17β-ol-3-one,

17α-(3-halopropynyl)-18-methylestra-5(10)9(11)-dien-17β-ol-3-one,

17α-(3-methylsulfonyloxypropynyl)estra-4,9(10),11-trien-17β-ol-3-one,

17α-(3-methylsulfonyloxypropynyl)estra-4,9(10)-dien-17β-ol-3-one,

17α-(3-methylsulfonyloxypropynyl)estra-5(10)9(11)-dien-17β-ol-3-one,

17α-(3-methylsulfonyloxypropynyl)-18-methylestra-4,9(10),11-trien-17β-ol-3-one,

17α-(3-methylsulfonyloxypropynyl)-18-methylestra-4,9(10)-dien-17β-ol-3-one,

17α-(3-methylsulfonyloxypropynyl)-18-methylestra-5(10)9(11)-dien-17β-ol-3-one,

17α-p-tolylsulfonyloxypropynyl)estra-4,9(10),11-trien-17β-ol-3-one,

17α-p-tolylsulfonyloxypropynyl)-estra-4,9(10)-dien-17β-ol-3-one,

17α-p-tolylsulfonyloxypropynyl)-estra-5(10),9(11)-dien-17β-ol-3-one,

17α-p-tolylsulfonyloxypropynyl)-18-methylestra-4,9-(10), 11-trien-17β-ol-3-one,

17α-p-toylsulfonyloxypropynyl)-18-methylestra-4,9(10)-dien-17β-ol-3-one,

17α-p-tolylsulfonyloxypropynyl)-18-methylestra-5(10), 9(11-dien-17β-ol-3-one and so forth.

The foregoing 17β-hydroxy compounds can be esterified under conventional tertiary carbinol conditions to give the corresponding 17β-acetates thereof.

Preparation 13

A solution of 1 g. of sodium borohydride in 3 ml. of water is added to an ice-cooled solution of 1 g. of 6,6-difluoroestr-4-ene-3,17-dione in 120 ml. of methanol and the mixture is allowed to stand for 16 hours at room temperature. The excess reagent is decomposed by the addition of acetic acid and the solution is then concentrated to a small volume in vacuo and diluted with water. The product is extracted with ethyl acetate and these extracts are washed with water, dried and evaporated to yield 6,6-difluoroestr-4-ene-3β,17β-diol which may be further purified by recrystallization from acetone:hexane.

A mixture of 3 g. of 6,6-difluoroestr-4-ene-3β,17β-diol, 10 ml. of pyridine and 0.9 ml. of acetic anhydride is allowed to stand at room temperature for 15 hours. The mixture is then poured into ice water and the solid which forms is collected by filtration, washed with water and dried to yield 3β,17β-diacetoxy-6,6-difluoroestr-4-ene, 3β-acetoxy-6,6-difluoroestr-4-en-17β-ol and 6,6-difluoro-17β-acetoxy-estr-4-en-3β-ol which are separated by chromatography.

A solution of 6 g. of 3β-acetoxy-6,6-difluoroestr-4-en-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-acetoxy-6,6-difluoroestr-4-en-17-one which may be further purified by recrystallization from acetone:hexane.

In like manner, 3β-acetoxy-6,6-difluoro-18-methylestr-4-en-17-one is prepared from 6,6-difluoro-18-methylestr-4-ene-3,17-dione.

The thus prepared derivative is treated in accordance with the procedures set forth above to prepare the 3β-acetoxy-6,6-difluoro-17α-(3-tetrahydropyran-2'-yloxypropynyl)-estr-4-en-17β-ol which is converted to the corresponding 17α-(3-hydroxypropynyl), 17α-(3-halopropynyl), 17α-(3-methylsulfonyloxypropynyl) and 17α-3-p-toluenesulfonyloxypropynyl) derivatives via the procedures set forth above. Also thus prepared is 3β,17β-diacetoxy-6,6-difluoro-17α-(3-halopropynyl) androst-4-ene and 3β,17β-diacetoxy-6,6-difluoro-17α-(3-methylsulfonyloxypropynyl)-androst-4-ene and 3β,17β-diacetoxy-6,6-difluoro-17α-(3-p-tolylsulfonyloxypropynyl)-androst-4-ene and 3β,17β-diacetoxy-6,6-difluoro-17α-(3-tetrahydrofuran-2'-yloxypropynyl)-androst-4-ene and 3β,17β-diacetoxy-6,6-difluoro-17α-(3-(4'-methoxytetrahydropyran-4'-yloxypropynyl.

Likewise prepared are the 3β-acetoxy-17α-(3-substituted propynyl)-estra-4,9-(10),11-triene compounds wherein the substituent is tetrahydrofuran-2-yloxy, tetrahydropyran-2-yloxy, 4-methoxytetrahydropyran-4-yloxy, halo, methylsulfonyloxy, and p-tolylsulfonyloxy.

Substitution of an alternate carboxylic acid anhydride in the above procedures affords the corresponding acylates, for example, the propionates, benzoates, pentanoates, and adamanatoates, for example.

3β-propionyloxy-6,6-difluoro-17α-(3-halopropynyl)-19-norandrost-4-en-17β-ol,

3β-propionyloxy-17α-(3-halopropynyl)-estra-4,9(10)-11-trien-17β-ol,

3β-acetoxy-6,6-difluoro-17α-(3-methylsulfonyloxypropynyl)-18-ethylestr-4-en-17β-ol, 3β-propionyloxy-6,6-difluoro-17α-(3-p-tolylsulfonyloxypropynyl)-androst-4-en-17β-ol, 3β-benzoyloxy-17α-(3-tetrahydropyran-2'-yloxypropynyl)-estra-4,9-(10),11-trien-17β-ol, 3β-benzoyloxy-17α-(3-benzenesulfonyloxypropynyl)-18-methylandrost-4-en-17β-ol, 3β-benzoyloxy-17α-(3-benzenesulfonyloxypropynyl-18-methylestra-4,9(10),11-trien-17β-ol, and 3β-adamantoyloxy-17α-(3-halopropynyl)-18-methylestr-5-(10)-en-17β-ol, and so forth.

Preparation 14

A solution of 2 g. of 6,6-difluoroestr-4-ene-3,17-dione in 20 ml. of anhydrous tetrahydrofuran is cooled to 31 75°C. in a dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 6,6-difluoroestr-4-ene-3β,17β-diol.

To a slurry of 1.0 g. of sodium hydride in 10 ml. of dry diethyleneglycol dimethyl ether under a dry nitrogen atmosphere is slowly added 1.0 g. of 6,6-difluoro-estr-4-ene-3β,17β-diol in 10 ml. of dry diethyleneglycol dimethyl ether in a dropwise fashon over a 20 minute period. To this mixture is added dropwise 0.9 g. of 2-chlorotetrahydropyran over a 10 minute period. The mixture is then stirred at room temperature for an additional 30 minutes and then cautiously added to an ice-water mixture with stirring. The organic phase is extracted with diethyl ether, dried and evaporated under reduced pressure to yield 3β,17β-bis(tetrahydropyran-2'-yloxy)-6,6-difluoroestr-4-ene, 3β-tetrahydropyran-2'-yloxy-6,6-difluoroestr-4-en-17β-ol and 6,6-difluoro-17β-tetrahydropyran-2'-yloxyestr-4-en-3β-ol which are separated by chromatography on alumina.

Substitution of dihydrofuran in the above procedure prepares the corresponding tetrahydrofuran-2'-yloxy derivatives.

A solution of 6 g. of 3β-tetrahydropyran-2'-yloxy-6,6°-difluoroestr-4-en-17β-ol in 120 ml. of pyridine is added to a mixture of 5 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-tetrahydrofuran-2'-yloxy-6,6-difluoroestr-4-en-17-one which may be further purified by recrystallization from acetone:hexane.

To a solution of 1 gram of lithium aluminum hydride in 100 ml. of anhydrous tetrahydrofuran is continuously bubbled a slow current of purified acetylene for one hour. Thereafter, 1 gram of 3β-tetrahydropyran-2'-yloxy-6,6-difluoroestr-4-en-17-one in 10 ml. of tetrahydrofuran is added and the reaction mixture stirred at room temperature for 4 hours. Eight milliliters of water is then added and the mixture is stirred for 30 minutes. The mixture is then filtered and the organic filtrate evaporated to yield 3β-tetrahydropyran-2'-yloxy-6,6-difluoro-17α-ethynylestr-4-en-17β-ol which is recrystallized from acetone:hexane.

In a similar manner, 3β-tetrahydropyran-17α-ethynylestra-4,9(10),11-trien-17β-ol, 3β-tetrahydrofuran-2'-yloxy-6,6-difluoro-17α-ethynylestr-4-en-17β-ol, and 3β-tetrahydrofuran-2'-yloxy-17α-ethynylestra-4,9(10),11-trien-17β-ol are prepared.

The thus prepared 3β-tetrahydropyran-2'-yloxy and 3β-tetrahydrofuran-2'-yloxy compounds are then treated in accordance with the above procedures to prepare:

3β-tetrahydropyran-2'-yloxy-6,6-difluoro-17α-(3-tetrahydrofuran-2'-yloxypropynyl)estr-4-ene-17β-ol, 3β-tetrahydropyran-2'-yloxy-17α-(3-tetrahydrofuran-2'-yloxypropynyl)estra-4,9(10),11-trien-17β-ol, 3β-tetrahydropyran-2'-yloxy-17α-(3-tetrahydrofuran-2'-yloxypropynyl)estra-4,9-(10)-dien-17β-ol.

3β-tetrahydropyran-2'-yloxy-17α-(3-tetrahydrofuran-2'-yloxypropynyl)estra-5(10)9(11)-trien-17β-ol, 3β-tetrahydropyran-2'-yloxy-6,6-difluoro-17α-(3-tetrahydropyran-2'-yloxypropynyl)estr-4-ene-17β-ol, 3β-tetrahydropyran-2'-yloxy-17α-(3-tetrahydropyran-2'-yloxypropynyl)estra-4,9(10),11-trien-17β-ol, 3β-tetrahydropyran-2'-yloxy-17α-(3-tetrahydropyran-2'-yloxypropynyl)estra-4,9(10)-dien-17β-ol, 3β-tetrahydropyran-2'-yloxy-17α-(3-tetrahydropyran-2'-yloxypropynyl)estra-5(10)-9(11)-dien-17β-ol, 3β-tetrahydropyran-2'-yloxy-6,6-difluoro-17α-(3-(4'-methoxytetrahydropyran-4'-yloxy)propynyl)estr-4-ene-17β-ol, 3β-tetrahydropyran-2'-yloxy-17α-(3-(4'-tetrahydropyran-4'-yloxy)propynyl)estra-4,9(10),11-trien-17β-ol, 3β-tetrahydropyran-2'-yloxy-17α-(3-(4'-tetrahydropyran-4'-yloxy)propynyl)estra-4,9(10)-dien-17β-ol, 3β-tetrahydropyran-2'-yloxy-17α-(3-(4'-tetrahydropyran-4'-yloxy)propynyl)estra-5(10)9(11)-dien-17β-ol, 3β-tetrahydro-2'-yloxy-6,6-difluoro-17α-(3-halopropynyl)estr-4-en-17β-ol, 3β-tetrahydropyran-2'-yloxy-17α-(3-halopropynyl)estra-4,9(10),11-trien-17β-ol, 3β-tetrahydropyran-2'-yloxy-17α-(3-halopropynyl)estra-4,9-(10)-dien-17β-ol, 3β-tetrahydro-2'-yloxy-17α-(3-halopropynyl)estra-5(10)9(11)-dien-17β-ol, 3β-tetrahydropyran-2'-yloxy-6,6-difluoro-17α-(3-methylsulfonyloxypropynyl)-estr-4-en-17β-ol, 3β-tetrahydropyran-2'-yloxy-17α-(3-methylsulfonyloxypropynyl)-estra-4,9(10),11-trien-17β-ol, 3β-tetrahydropyran-2'-yloxy-17α-(3-methylsulfonyloxypropynyl)-estra-4,9(10)-dien-17β-ol, 3β-tetrahydropyran-2'-yloxy-17α-(3-methylsulfonyloxypropynyl)-estra-5(10)9(11)-dien-17β-ol, 3β-tetrahydropyran-2'-yloxy-6,6-difluoro-17α-(3-p-tolylsulfonyloxypropynyl)-estr-4-en-17β-ol, 3β-tetrahydropyran-2'-yloxy-17α-(3-p-tolylsulfonyloxypropynyl)-estra-4,9(10),11-trien-17β-ol, 3β-tetrahydropyran-2'-yloxy-17α-(3-p-tolylsulfonyloxypropynyl)-estra-4,9(10)-trien-17β-ol, 3β-tetrahydropyran-2'-yloxy-17α-(3-p-tolylsulfonyloxypropynyl)-estra-4,9(10)-dien-17β-ol, 3β-tetrahydropyran-2'-yloxy-17α-(3-p-tolylsulfonyloxypropynyl)-estra-5(10)9(11)-dien-17β-ol, and the corresponding 3β-tetrahydrofuran-2'-yloxy compounds thereof.

The thus prepared 3β-monoethers can then be acylated as described above to prepare the mixed ester-ether derivatives. Thus formed, for example, are 3β-tetrahydropyran-2'-yloxy-6,6-difluoro-17α-(3-tetrahydropyran-2'-yloxy-propynyl)-17β-acetoxyestr-4-ene, 3β-tetrahydrofuran-2'-yloxy-17α-(3-tetrahydropyran-2'-yloxypropynyl)-17β-acetoxyestra-4,9-(10),11-trien, 3β-tetrahydrofuran-2'-yloxy-17α-(3-tetrahydropyran-2'-yloxypropynyl)-17β-acetoxyestra-4,9-(10)-dien, 3β-tetrahydrofuran-2'-yloxy-17α-(3-tetrahydropyran-2'-yloxypropynyl)-17β-acetoxyestra-5(10)9(11)-dien, 3β-tetrahydropyran-2'-yloxy-6,6-difluoro-17α-(3-tetrahydropyran-2'-yloxypropynyl)-17β-acetoxyandrost-4-ene, 3'-tetrahydrofuran-2'-yloxy-17α-(3-tetrahydropyran-2'-yloxypropynyl)-17β-acetoxyestra-4,9(10),11-trien, 3β-tetrahydropyran-2'-yloxy-6,6-difluoro-17α-(3-tetrahydropyran-2'-yloxypropynyl)-17β-propionyloxyestr-4-ene, 3β-tetrahydrofuran-2'-yloxy-17α-(3-tetrahydropyran-2'-yloxypropynyl)-17β-propionyloxyestra-4,9(10),11-triene, 3β-tetrahydropyran-2'-yloxy-6,6-difluoro-17α-(3-tetrahydropyran-2'-yloxypropynyl)-17β-propionyloxyandrost-4-ene, 3β-tetrahydrofuran-2'-yloxy-17α-(3-tetrahydropyran-2'-yloxypropynyl)-17β-propionyloxyestra-4,9(10),11)-triene, 3β-tetrahydrofuran-2'-yloxy-6,6-difluoro-17α-(3-tetrahydropyran-2'-yloxypropynyl)-17β-caproyloxyestr-4-ene, 3β-tetrahydrofuran-2'-yloxy-17α-(3-tetrahydropyran-2'-yloxypropynyl)-17β-caproyloxyestr-4,9(10),11-triene, 3β-tetrahydropyran-2'-yloxypropynyl)-17β-caproyloxyandrost-4-ene, 3β-tetrahydrofuran-2'-yloxy-17α-(3-tetrahydropyran-2'-yloxypropynyl)-17β-caproyloxyestra-4,9(10),11-triene, and so forth, as well as the corresponding 17α-(3-halopropynyl), 17α-(3-methylsulfonyloxypropynyl), and 17α-(3-p-tolylsulfonyloxypropynyl) compounds.

Preparation 15

The compounds 3β-acetoxy-6,6-difluoroestr-4-ene-17-one and 3β-acetoxyestra-4,9(10),11-triene are treated in accordance with the procedure as set forth above to prepare 3β-acetoxy-6,6-difluoro-17α-ethynylestr-4-ene-17β-ol and 3β-acetoxy-17α-ethynylestr-4,9(10),11-trien-17β-ol. These derivatives are then etherified to respectively prepare the corresponding 3β-acetoxy-6,6-difluoro-17α-ethynyl-17β-tetrahydropyran-2'-yloxyestr-4-ene, 3β-acetoxy-17α-ethynyl-17β-tetrahydropyran-2'-yloxyestr-4,9(10),11-triene, 3β-acetoxy-6,6-difluoro-17α-ethynyl-17β-tetrahydrofuran-2'-yloxyestr-4-ene and 3β-acetoxy-17α-ethynyl-17β-tetrahydrofuran-2'-yloxestra-4,9(10),11-triene.

In like manner, the foregoing procedures can be followed with other starting 3β-acylates described in the foregoing procedures.

Preparation 16

Two milliliters of dihydropyran are added to a solution of 1 g. of 6,6-difluoro-17α-ethynylestr-4-en-17β-ol-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 6,6-difluoro-17α-ethynyl-17β-tetrahydropyran-2'-yloxyestr-4-en-3-one which is recrystallized from pentane.

A solution of 2 g. of 6,6-difluoro-17α-ethynyl-17β-tetrahydropyran-2'-yloxyestr-4-en-3-one in 20 ml. of anhydrous tetrahydrofuran is cooled to −75°C. in a dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 6,6-difluoro-17α-ethynyl-17β-tetrahydropyran-2'-yloxyestr-4-en-3β-ol.

To a slurry of 1.0 g. of sodium hydride in 10 ml. of dry diethyleneglycol dimethyl ether under a dry nitrogen atmosphere is slowly added 1.0 g. of 6,6-difluoro-17α-ethynyl-17β-tetrahydropyran-2'-yloxyestr-4-en-3-one in 10 ml. of dry diethyleneglycol dimethyl ether in a dropwise fashion over a 20 minute period. To this mixture is added dropwise, 0.9 g. of 2-chlorotetrahydropyran over a 10 minute period.

The mixture is stirred at room temperature for an additional 30 minute and then cautiously added to an ice-water mixture with stirring. The organic phase is extracted with diethyl ether, dried and evaporated under reduced pressure to yield 3β,17α-bistetrahydropyran-2'-yloxy-6,6-difluoro-17α-ethynylestr-4-ene which may be further purified via recrystallization from acetone:-hexane.

Two milliliters of dihydropyran are added to a solution of 1 g. of 6,6-difluoro-17α-ethynyl-17β-tetrahydropyran-2'-yloxyestr-4-en-3-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β,17β-bistetrahydropyran-2'-yloxy-6,6-difluoro-17α-ethynylestr-4-ene which is recrystallized from pentane.

The thus prepared compound is then treated in accordance with the procedure set forth, for example, in Preparation 4, Paragraph 3 to give 3β,17β-bistetrahydropyran-2'-yloxy-6,6-difluoro-17α-(3-hydroxypropynyl)-estr-4-ene which is, in turn, halogenated via the procedures described in Preparations 3 to 6 and 8 to give the corresponding 17α-(3-halopropynyl) compounds, e.g., 3β,17β-bistetrahydropyran-2'-yloxy-6,6-difluoro-17α(3-chloropropynyl)-estr-4-ene, and 3β,17β-bistetrahydropyran-2'-yloxy-6,6-difluoro-17α-(3-bromopropynyl)-estr-4-ene, and 3β,17β-bistetrahydropyran-2'-ylloxy-6,6-difluoro-17α-(3-fluoropropynyl)-estr-4-ene.

Preparation 17

One gram of estr-5(10)-ene-3,17-dione is suspended in 10 ml. of anhydrous methanol containing 0.16 ml. of perchloric acid (70%) per liter of methanol. The reaction mixture is stirred at room temperature and under anhydrous conditions overnight. Solid sodium methoxide is then added and the reaction mixture is then slowly diluted with from 5 to 10 times its volume with water. The mixture is then filtered to give 3,3-dimethoxyestr-5(10)-en-17-one which can be recrystallized from methylene chloride:methanol containing a trace of triethylamine.

The thus prepared compound is then treated in accordance with the procedures of Preparation 7 to give 3,3-dimethoxy-17α-(3-tetrahydropyran-2'-yloxypropynyl)-estr-5(10)-en-17β-ol.

One gram of 3,3-dimethoxy-17α-(3-tetrahydropyran-2'-yloxypropynyl)-estr-5(10)-en-17β-ol is dispersed in 45 ml. of acetone containing 0.05 mg. of malonic acid in 5 ml. of water and the resultant mixture is allowed to stand at room temperature overnight. After this time it is poured into dilute aqueous potassium bicarbonate solution and extracted with ether. The extracts are dried and evaporated to give 17α-(3-hydroxypropynyl)-estr-5(10)-en-17β-ol-3-one.

The thus prepared compound is then halogenated as described herein, with or without prior conversion to the 17β-acetate, to give the corresponding 3-halopropynyl compounds, e.g., 17α-(3-chloropropynyl)-estr-5(10)-en-17β-ol-3-one.

The foregoing hydrolysis can be practiced upon the product of Preparation 11 to give 6,6-difluoro-17α-(3-chloropropynyl)-estr-4-ene-3β,17β-diol. 6,6-Difluoro-17α-(3-bromopropynyl)-estr-4-ene-3β,17β-diol and 6,6-difluoro-17α-β-iodoor-fluoropropynyl)-estr-4-ene-3β,17β-diol are also thus prepared from the respective halo starting compounds.

One gram of 6,6-difluoro-17α-(3-chloropropynyl)-estr-4-ene-3β,17β-diol in 100 ml. of chloroform which has been distilled over calcium chloride, is stirred for 18 hours at room temperature with 10 g. of freshly precipitated magnanese dioxide. The inorganic material is then removed by filtration and washed with hot chloroform and the combined filtrate and washings are evaporated to yield 6,6-difluoro-17α-(3-chloropropynyl)-estr-4-en-17β-ol-3-one which may be further purified through recrystallization from acetone-hexane.

Similarly, 6,6-difluoro-17α-(3-bromopropynyl)-estr-4-en-17β-ol-3-one and 6,6-difluoro-17α-(3-iodo- or fluoropropynyl) estr-4-en-17β-ol-3-one are prepared. The corresponding 17β-acetates thereof are prepared by treatment of the 17β-ol with acetic acid and acetic anhydride in the presence of p-toluenesulfonic acid in the manner known per se.

Preparation 18

Into a solution of 10 grams of 3,17-diacetoxy-18-methylestr-5-ene in 120 ml. of dry carbon tetrachloride which is maintained at 0°C. is slowly bubbled nitrosyl fluoride over a period of ½ hour. The reaction is monitored by tlc. After the reaction is complete, it is warmed until $NO_2$ is discharged. The reaction mixture is then washed with water and extracted with methylene chloride. The extracts are evaporated to dryness. The residue is recrystallized from acetone:hexane. The recrystallized material (or total crude) is percolated over 120 grams of aluminum oxide with benzene to give 3,17-diacetoxy-5α-fluoro-18-methylestran-6-one.

To a solution of 3.2 grams of 3,17-diacetoxy-5α-fluoro-18-methylestran-6-one in 40 ml. of methylene chloride are added 80 g. of sulfur tetrafluoride. The reaction mixture is allowed to stand at room temperature overnight in a pressure flask. After this time, the reaction flask is vented and the reaction mixture is poured into ice water and washed with 5% aqueous sodium bicarbonate solution. The washed material is dried over sodium sulfate and evaporated to dryness, to give 3,17-diacetoxy-5α,6,6-trifluoro-18-methylestrane.

3,17-Diacetoxy-5α,6,6-trifluoro-18-methylestrane (2.6 g.) is dispersed in a solution of 50 ml. of methanol containing 4 ml. of concentrated hydrogen chloride. The resultant mixture is refluxed for 1.5 hours. It is then diluted with water and the methanol eliminated under reduced pressure. The mixture is then cooled to room temperature and filtered and the precipitate washed with water and air dried. The material is then dissolved in 50 ml. of acetone and treated with about 6 ml. of 8N chromic acid in sulfuric acid without cooling. The mixture is then diluted with water containing a trace of methanol and the solvent is then eliminated under reduced pressure. The solid is collected and air dried.

Two grams of the resultant solid is dispersed in 75 ml. of methanol containing 6 grams of sodium acetate and the resultant mixture is refluxed for 3 hours. The mixture is then diluted with water and the solvent eliminated under reduced pressure. The mixture is then cooled to room temperature and the solid collected by filtration and air dried to give 6,6-difluoro-18-methylestr-4-ene-3,17-dione.

The compound thus obtained is treated with 6 ml. of ethylene glycol, 2 g. of oxalic acid, and 75 ml. of benzene under reflux with the use of a water separator for a period of 18 hours. The mixture is then poured over ice containing a saturated solution of potassium bicarbonate. The organic phase is separated and the water phase extracted two times with benzene. The organic extracts are combined and dried over anhydrous sodium sulfate and, after filtration, evaporated to dryness under reduced pressure. The residue is crystallized fractionally from acetone:hexane to give 3,3-ethylenedioxy-6,6-difluoro-18-methylestr-4-en-17-one.

The resultant compound is then treated in accordance with the first paragraph of Preparation 7 to give 3,3-ethylenedioxy-6,6-difluoro-17α-(3-tetrahydropyran-2'-yloxypropynyl)-18-methylestr-4-en-17β-ol.

Alternatively, the second paragraph of Preparation 7 can be practiced to give 3,3-ethylenedioxy-6,6-difluoro-17α-(3-hydroxypropynyl)-18-methylestr-4-en-17β-ol, after acetate hydrolysis. Alternatively, the 17β-acetate is preserved to give 3,3-ethylenedioxy-6,6-difluoro-17α-(3-hydroxypropynyl)-17β-acetoxy-18-methylestr-4-en-3-one. This compound, or the 17β-ol, can be converted to the corresponding 17α-(3-chloropropynyl) compounds by the method of Preparation 5.

These compounds (i.e., the 17α-(3-hydroxy- or -chloropropynyl) can be ketalized as set forth in Preparation 11, paragraph 1 or Preparation 12, paragraph 4. The 3,3-dimethoxy and 3,3-ethylenedioxy compounds in the 17α-(3-hydroxypropynyl) series can then be chlorinated (preparation 5) to give the corresponding 17α-(3-chloropropynyl)-6,6-difluoro ketal products, e.g.

3,3-ethylenedioxy-6,6-difluoro-17α-(3-chloropropynyl)-estr-4-en-17β-ol-3-one and
3,3-dimethoxy-6,6-difluoro-17α-(3-chloropropynyl)estr-4-en-17β-ol-3-one and the 17β-acetates thereof.

In like manner, the corresponding compounds in the 13-methyl series are prepared.

In like manner, 3,3-ethylenedioxy-6,6-difluoro-17α-(3-tetrahydropyran-2'-yloxy- or -hydroxypropynyl)-estr-4-en-17β-ol or their acetates is prepared.

Preparation 19

The following procedures illustrate the manner by which the 17α-(3-iodopropynyl) starting compounds are prepared by halogen exchange with sodium iodide.

A mixture of 1 gram of 17α-(3-bromopropynyl)-17β-acetoxyestr-4-en-3-one in 50 ml. of dry methylethyl ketone containing 1 g. of sodium iodide is refluxed for 10 hours. After this time, the reaction mixture is poured into water and the resultant mixture extracted with ether. The ether extracts are washed with water, dried and evaporated at 20°C. in vacuum to give 17α-(3-iodopropynyl)-17β-acetoxy-estr-4-en-3-one.

In like manner, 17α-(3-chloropropynyl) starting compounds are converted to the corresponding 17α-(3-iodopropynyl) compounds. The foregoing reaction is repeated using acetone in lieu of methylethyl ketone, with similar results.

EXAMPLE 1

A suspension of lithium aluminum hydride (5 g.) in 100 ml. of dry ether is heated under reflux for 1 hour. It is then cooled to room temperature and treated dropwise with stirring with 5 g. of 3-ethoxy-17α-(3-tetrahydropyran-2'-yloxypropynyl)-estra-3,5-dien-17β-ol in 100 ml. of dry ether. The reaction mixture is stirred and heated under reflux for 2½ hours. Then the excess reagent is decomposed at 0°C. with acetone and a saturated sodium sulfate solution and solid sodium sulfate. It is then filtered, washed with methylene chloride, and evaporated to dryness to give 3-ethoxy-17α-propadienylestra-3,5-dien-17β-ol which is hydrolized with HCl in methanol (100 ml.) at room temperature for 15 minutes. It is poured into ice-water, extracted with methylene chloride, washed with water, dried and evaporated to dryness to obtain the 17α-propadienylestr-4-en-17β-ol-3-one which is further purified by preparative chromatoplate in a system of ethyl acetate/hexane (40/.60).

The foregoing procedure is repeated using 3-ethoxy-17α-(3-chloropropynyl)-estra-3,5-dien-17β-ol,3-ethoxy- 17α-(3-iodo or bromopropynyl)-estra-3,5-dien-17β-ol, 3-ethoxy-17α-(3-methylsulfonyloxypropynyl)-estra-3,5-dien-17β-ol, 3-ethoxy-17α-(3-toluenesulfonyloxypropynyl)-estra-3,5-dien-17β-ol, 3-ethoxy-17α-(3-tetrahydrofuran-2'-yloxypropynyl)-estra-3,5-dien-17β-ol, 3-ethoxy-17α-3-(4-methoxytetrahydropyran-4-yloxypropynyl)-estra-3,5-dien-17β-ol to obtain the same 17α-propadienyl product. The enol ether protecting group is introduced by the method of Preparation 1.

Similarly, 17α-propadienyl-18-methylestr-4-en-17β-ol-3-one, 6,6-difluoro-17α-propadienylestr-4-en-17β-ol-3-one, 6,6-difluoro-17α-propadienyl-18-methylestr-4-en-17β-ol-3-one, 17α-propadienylestra-5(10),9(11)-dien-17β-ol-3-one, 17α-propadienyl-18-methylestra-5(10),9(11)-dien-17β-ol-3-one, 17α-propadienylestra-4,9(10)-dien-17β-ol-3-one, 17α-propadienyl-18-methylestra-4,9(10)-dien-17β-ol-3-one, 17α-propadienylestra-4,9(10),11-dien-17β-ol-3-one, 17α-propadienyl-18-methylestra-4,9(10),11-dien-17β-ol-3-one are prepared from the respective 3-substituted propynyl starting compounds.

The foregoing procedures can be practiced upon the corresponding 17β-acetoxy starting compounds to prepare the corresponding 17α-propadienyl-17β-ol products. These can be acylated to the 17β-acyloxy compounds.

EXAMPLE 2

A solution of 1 g. of 17α-(3-tetrahydropyran-2'-yloxypropynyl)-estra-4,9(10),11-trien-17β-ol-3-one in 50 ml. of tetrahydrofuran is added over a 30 minute period to a stirres suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 17α-propadienylestra-4,9(10),11-triene-3β,17β-diol product which may be further purified through recrystallization from acetone:hexane.

A solution of 6 g. of 17α-propadienylestra-4,9(10),11-triene-3β,17β-diol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yiled 17α-propadienylestra-4,9(10),11-trien-17β-ol-3-one which may be further purified by recrystallization from acetone:hexane.

Likewise prepared are 17α-propadienyl-18-methylestra-4,9(10),11-trien-17β-ol-3-one, 17α-propadienyl-18-methylestra-4,9(10)-dien-17β-ol-3-one, 17α-propadienyl-18-methylestra-5(10),9(11)-dien-17β-ol-3-one, and after acetylation at C-17, 17α-propadienyl-17β-acetoxy-18-methylestra-4,9(10),11-trien-3-one, 17α-propadienyl-17β-acetoxy-18-methylestra-4,9(10)-dien-17β-ol-3-one, 17α-propadienyl-17β-acetoxy-18-methylestra-5(10),9(11)-dien-17β-ol-3-one, 17α-propadienyl-17β-acetoxyestra-4,9(10),11-trien-3-one, 17α-propadienyl-17β-acetoxyestra-4,9(10)-dien-17β-ol-3-one, 17α-propadienyl-17β-acetoxyestra-5(10),9(11)-dien-17β-ol-3-one.

EXAMPLE 3

One gram of lithium di-(2-methoxyethoxy)aluminum hydride is dispersed in 50 milliliters of diethyleneglycol methyl ether at room temperature. A steroidal solution of 1 g. of 3-methoxy-17α-(3-p-tolylsulfonyloxypropynyl)-estra-1,3,5(10)-trien-17β-ol dispersed in 50 millilers of diethyleneglycol methyl ether is added to the hydride dispersion. This addition is conducted in a portionwise fashion over a period of about 30 minutes. It is further conducted at room temperature and with stirring. Following the addition, the resultant mixture is heated to its boiling point and maintained under reflux for about two hours. After this time, 5 milliliters of ethyl acetate are cautiously added to the reaction mixture, followed by 2 milliliters of water. Sodium sulfate is then added to the resultant mixture and the whole mixture filtered. The collected solid is washed with hot ethyl acetate. The organic solutions are all combined and then evaporated to obtain the 3-methoxy-17α-propadienylestra-1,3,5(10)-trien-17β-ol product which can be further purified by recrystallization from acetone:hexane.

When the above is repeated, except with a work-up as described in Example 1, i.e., 0°C. reagent decomposition, 3-methoxy-17α-propadienylestra-1,3,5(10)-trien-17β-ol is prepared.

EXAMPLE 4

A solution of 1 g. of 6,6-difluoro-17α-(3-fluoropropynyl)-estr-4-en-17β-ol-3-one in 50 ml. of tetrahydrofuran is added over a 30 minute period to a stirred suspension of 1 g. of aluminum hydride in 50 ml. of diethyl ether and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 6,6-difluoro-17α-propadienylestr-4-ene-3β,17β-diol product which may be further purified through from acetone:hexane.

The above is repeated using 6,6-difluoro-17α-(tetrahydropyran-2'-yloxypropynyl)estr-4-ene-17β-ol-3-one as the starting material, with the same results.

One gram of 6,6-difluoro-17α-propadienylestr-4-ene-3β,17β-diol in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 6,6-difluoro-17α-propadienylestr-4-en-17β-ol-3-one which may be further purified through recrystallization from acetone:hexane.

EXAMPLE 5

A solution of 1 g. of 17α-(3-bromopropynyl)-estr-5(10)-en-17β-ol-3-one in 50 ml. of tetrahydrofuran is added over a 30 minute period to a stirres suspension of 1 g. of lithium di-(2-methoxyethoxy)-aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 17α-propadienylestr-5(10)-ene-3β,17β-diol product which may be further purified through recrystallization from acetone:hexane.

Oxidation provides the 17α-propadienylestr-5(10)-en-17β-ol-3-one product. Use of 3,3-dimethoxy-17α-(3-tetrahydropyran-2yloxypropynyl)estr-5(10)-en-17β-ol provides the same product after malonic acid hydrolysis of the C-3 diether group.

EXAMPLE 6

A solution of 1 g. of 17α-(3-chloropropynyl)-17β-hydroxyestr-4-en-3-one in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added the mixture is filtered and the solid thus collected, is washed with hot ethyl acetate. The combined organic solutions are then evaporated to yield 1-7α-propadienylestr-4-en-3β,17β-diol product which may be further purified through recrystallization from acetone-hexane.

A solution of 6 g. of 17α-propadienylestr-4-en-3β,17β-diol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-propadienylestr-4-en-17β-ol-3-one which may be further purified by recrystallization from acetone:hexane.

EXAMPLE 7

A suspension of lithium aluminum hydride (10.0 g.) in 200 ml. of dry diethyl ether is heated under reflux for 1 hour, cooled to room temperature and treated dropwise with stirring with a solution of 10.0 g. of 3-ethoxy-17α-(3-tetrahydropyran-2-yloxypropynyl)-estra-3,5-dien-17β-ol in 200 ml. of dry ether. The resulting suspension is heated under reflux with stirring for 2.5 hours and after cooling the reaction mixture the excess of hydride is decomposed by the addition of acetone. Saturated sodium sulfate solution and solid sodium sulfate are added to precipitate the metal salts. The resulting mixture is filtered and the collected solids are washed with methylene dichloride. The filtrate is dried (Na$_2$SO$_4$) and evaporated to yield a solid which is hydrolyzed by treatment with a solution of 1% hydrochloric acid in methanol (200 ml) for 15 minutes at room temperature. Water (2 l.) is added and the resulting mixture is extracted exhaustively with methylene dichloride. The pooled organic extracts are washed with water, dried (Na$_2$SO$_4$) and evaporated to yield 17α-propadienylestr-4-en-17β-ol-3-one which is purified by preparative tlc [ethyl acetate-hexane (2:3)].

In like manner, there are prepared 17α-propadienyl-18-methylestr-4-en-17β-ol-3-one, 6,6-difluoro-17α-propadienylestr-17β-ol-3-one, and 6,6-difluoro-17α-propadienyl-18-methylestr-4-en-17β-ol-3-one which upon acetylation with acetic anhydride, acetic acid, and p-toluenesulfonic acid respectively give 17α-propadienyl-17β-acetoxy-18-methylestr-4-en-3-one, 6,6-difluoro-17α-propadienyl-17β-acetoxyestr-4-en-3-one, and 6,6-difluoro-17α-propadienyl-17β-acetoxy-18-methylestr-4-en-17β-ol-3-one. Likewise prepared are 17α-propadienylestra-5(10),9(11)-dien-17β-ol-3-one, 17α-propadienyl-18-methylestra-5(10),9(11)-dien-17β-ol-3-one, 17α-propadienylestra-4,9(10)-dien-17β-ol-3-one, 17α-propadienyl-18-methylestra-4,9(10)-dien-17β-ol-3-one, 17α-propadienylestra-4,9(10),11-trien-17β-ol-3-one, and 17α-propadienyl-18-methylestra-4,9(10),11-trien-17β-ol-3-one and the corresponding 17β-acetates.

EXAMPLE 8

The reaction mixture of Preparation 18 containing 3,3-ethylenedioxy-6,6-difluoro-17α-(3-tetrahydropyran-2-yloxypropynyl)-18-methylestr-4-en-17β-ol in ether solution is treated with 1 gram of lithium aluminum hydride in 25 ml. of diethyl ether. After a period of 2 hours at room temperature, ethyl acetate is added followed by solid anhydrous sodium sulfate. The resultant mixture is diluted with ethyl acetate and filtered over Celite. The filtrates are concentrated to dryness and dissolved in a mixture of 2% ethyl acetate:98% hexane and filtered through a column of 5 grams of silica gel, washing with the same solvent. The homogeneous fractions containing 3,3-ethylenedioxy-6,6-difluoro-17α-propadienyl-18-methylestr-4-en-17β-ol are combined and concentrated to dryness. The residue is recrystallized from acetone:hexane.

The recrystallized residue (25 mg.) is suspended in about 2 ml. of methanol and treated with 1 drop of concentrated hydrogen chloride. After monitoring with tlc shows the reaction to be complete, the reaction mixture is diluted with 2 ml. of water and filtered to give 6,6-difluoro-17α-propadienyl-18-methylestr-4-en-17β-ol-3-one.

In like manner, 6,6-difluoro-17α-propadienylestr-4-en-17β-ol-3-one is prepared from the corresponding starting compound. This procedure is repeated using 6,6-difluoro-17α-(3-chloropropynyl)-estr-4-ene-3β,17β-diol as a starting compound to give 6,6-difluoro-17α-propadienylestr-4-en-3β,17β-diol which is oxidized with manganese dioxide, as described above to give 6,6-difluoro-17α-propadienylestr-4-en-17β-ol-3-one. Use of the 3β,17β-bistetrahydropyran-2′-yloxy starting compounds affords the corresponding 3β,17β-bistetrahydropyran-2′-yloxy-17α-propadienyl products which can be hydrolyzed with malonic acid, as described above, to give the diol followed by oxidation, as described above, to give 6,6-difluoro-17α-propadienylestr-4-en-17β-ol-3-one. The product can be acylated or the procedure performed with 6,6-difluoro-17α-(3-chloropropynyl)-17β-acetoxy-estr-4-en-3-one to give 6,6-difluoro-17α-propadienyl-17β-acetoxyestr-4-en-3-one. Use of the corresponding 3-tetrahydropyran-2-yloxypropynyl compounds give similar results.

EXAMPLES 9 TO 18

In accordance with the methods and procedures of the present invention, the following are carried out.

From 17α-(3-methylsulfonyloxypropynyl)-17β-acetoxy-18-methylestra-4,9(10),11-trien-3-one there is obtained the 17α-propadienyl-18-methylestra-4,9(10),11-trien-17β-ol-3-one and, after acetylation, 17α-propadienyl-17β-acetoxy-18-methylestra-4,9(10),11-trien-3-one product.

From 17α-(3-chloropropynyl)-18-ethylestr-4-en-17β-ol-3-one there is obtained the 17α-propadienyl-18-ethylestr-4-en-17β-ol-3-one product.

From 17α-(3-fluoropropynyl)-17β-tetrahydrofuran-2′-yloxyestra-1,3,5(10)-trien-3-ol, there is obtained the 17α-propadienyl-17β-tetrahydrofuran-2′-yloxyestra-1,3,5-(10)-trien-3-ol product.

From 17α-(3-bromopropynyl)-17β-propionyloxy-18-n-propylestr-5(10)-one, there is obtained the 17α-'propadienyl-18-n-propylestr-5(10)-en-17β-ol-3-one product.

From 17α-(3-benzenesulfonyloxypropynyl)-18-isopropyl-estra-1,3,5(10)-triene-3,17β-diol, there is obtained the corresponding 17α-propadienyl-18-isopropylestra-1,3,5(10)-triene-3,17β-diol product.

From 3-ethoxy-17α-(3-p-tolylsulfonyloxypropynyl)-17β-propionyloxyestra-1,3,5-(10)-triene, there is obtained the 3-ethoxy-17α-propadienyl-1,3,5,(10)-trien-17β-ol product.

From 17α-(3-bromopropynyl)-17β-butyryloxy-18-isopropylandrost-4-en-3-one, there is obtained the 17-α-propadienyl-18-isopropylandrost-4-en-17β-ol-3-one product.

From 17α-(3-chloropropynyl)-17β-acetoxy-18-methylestr-4-en-3-one, there is obtained the 17α-propadienyl-18-methylestr-4-en-17β-ol-3-one product.

From 3-methoxy-17α-(3-ethanesulfonyloxypropynyl)-17β-tetrahydropyran-2′-yloxyestra-1,3,5(10)-trien, there is obtained the 3-methoxy-17α-propadienyl-17β-tetrahydropyran-2′-yloxyestra-1,3,5(10)-triene product.

From 3-ethoxy-17α-(3-chloropropynyl)-estra-4,9(10),11-trien-17β-ol, there is obtained the corresponding 3-ethoxy-17α-propadienylestra-4,9(10),11-trien-17β-ol product.

In accordance with foregoing methods, the following compounds are prepared:

3β,17β-bis(tetrahydropyran-2′-yloxy)-6,6-difluoro-17α-propadienylestr-4-ene,

3β,17β-bis(tetrahydropyran-2′-yloxy)-17α-propadienyl-estra-4,9(10),11-triene, 6,6-difluoro-17α-propadienyl-17β-acetoxyestr-4-en-3-one, 17α-propadienyl-17β-acetoxyestra-4,9(10),11-trien-3-one, 6,6-difluoro-17α-propadienyl-17β-propionyloxyandrost-4-en-3-one, 17α-propadienyl-17β-propionyloxyestra-4,9(10),11-trien-3-one, 17α-propadienyl-17β-benzoyloxyestr-4-en-3-one, 17α-propadienyl-17β-benzoyloxyestra-4,9(10), 11-trien-3-one, 6,6-difluoro-17α-propadienyl-17β-adamantoyloxyestr-4-en-3-one, 17α-propadienyl-17β-adamantoyloxyestra-4,9(10),11-trien-3-one, 17α-propadienyl-17β-adamantoyloxyestr-4-en-3-one, 3β-propionyloxy-6,6-difluoro-17α-propadienylandrost-4-en-17β-ol, 3β-propionyloxy-17α-propadienylestra-4,9(10),11-trien-17β-ol, 3β,17β-bis(adamantoyloxy)-6,6-difluoro-17α-propadienyl-estr-4-ene, 3β,17β-bis(adamantoyloxy)-17α-propadienylestra-4,9(10),11-trien-17β-ol, 3β-(β-chloropropionyloxy)-6,6-difluoro-17α-propadienyl-17β-tetrahydrofuran-2′-yloxyandrost-4-ene, 3β-(β-chloropropionyloxy)-17α-propadienyl-17β-tetrahydrofuran-2′-yloxyestra-4,9(10),11-trien-17β-ol, 3β-butyryloxy-6,6-difluoro-17α-propadienyl-17β-tetrahydropyran-2′-yloxyandrost-4-ene, 3β-butyryloxy-17α-propadienyl-17β-tetrahydropyran-2′-yloxyestra-4,9(10),11-trien-17β-ol, 3β-tetrahydrofuran-2′-yloxy-6,6-difluoro-17α-propadienyl-17β-caproyloxyestr-4-ene, 3β-tetrahydrofuran-2′-yloxy-17α-propadienyl-17β-caproyloxyestra-4,9(10),11-trien-17β-ol, 3β-tetrahydropyran-2′-yloxy-6,6-difluoro-17α-propadienyl-17β-caproyloxyestr-4-ene, 3β-tetrahydropyran-2′-yloxy-17α-propadienyl-17β-caproyloxyestra-4,9(10),11-trien-17β-ol, 3β-tetrahydropyran-2′-yloxy-6,6-difluoro-17α-propadienyl-17β-heptanoyloxyandrost-4-ene, 3β-tetrahydropyran-2′-yloxy-17α-propadienyl-17β-heptanoyloxyestra-4,9(10),11-trien-17β-ol, 3β,17β-dipentanoyloxy-6,6-difluoro-17α-propadienylestr-4-ene, and 3β,17β-dipentanoyloxy-17α-propadienylestra-4,9(10),11-trien-17β-ol.

Elaboration at C-3β can be performed after the principal reaction as follows.

EXAMPLE 19

The 3-oxo compounds are reduced by the principal reaction hereof so as to prepare, for example, 17α-propadienylestr-4-ene-3β,17β-diol, 17α-propadienyl-17β-acetoxyestr-5-en-3β-ol, 17α-propadienyl-17β-propionyloxyandrost-4-en-3β-ol, 17α-propadienyl-17β-tetrahydrofuran-2'-yloxyestr-4-en-3β-ol, 17α-propadienyl-17β-benzoyloxyandrost-4-en-3β-ol, 17α-propadienyl-17β-adamantoyloxyestr-4-en-3β-ol, 6,6-difluoro-17α-propadienylestr-4-ene-3β,17β-diol, 17α-propadienylestr-4,9(10),11-triene-3β,17β-diol, 6,6-difluoro-17α-propadienyl-17β-(β-chloropropionyloxy)-androst-4-en-3β-ol, and 17α-propadienyl-17β-(β-chloropropionyloxy)-estra-4,9(10),11-trien-3β-ol.

EXAMPLE 20

A solution of 17α-propadienylestr-4-en-17β-ol-3-one (0.35 g.) and lithium tri-t-butoxyaluminum hydride (2.0 g.) in anhydrous tetrahydrofuran (20 ml.) is heated under reflux for 16 hours, cooled and diluted with water. The resulting mixture is extracted with several portions of methylene dichloride and the combined extracts are washed with water, dried ($Na_2SO_4$) and evaporated. Purification of the resulting product by preparative tlc affords 17α-propadienylestr-4-ene-3β,17β-diol. Treatment hereof (0.20 g.) with 2.5 ml. of acetic anhydride-pyridine (1:4) for 18 hours at room temperature provides the 3β-acetoxy-17α-propadienylestr-4-en-17β-ol.

EXAMPLE 21

Two milliliters of dihydropyran are added to a solution of 1 g. of 17α-propadienyl-17β-caproyloxyandrost-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3β-tetrahydropyran-2'-yloxy-17α-propadienyl-17β-caproyloxyandrost-4-ene which is recrystallized from pentane.

To a solution of 1 g. of 17α-propadienylandrost-4-ene-3β,17β-diol in 20 ml. of benzene is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5% aqueous sodium bicarbonate solution. The product is extracted with ethyl acetate, the organic solution is washed with water to neutral, dried over anhydrous magnesium sulfate, and evaporated to dryness under reduced pressure. The oily residue crystallizes on the addition of ether to yield the 3β,17β-bis(tetrahydrofuran-2'-yloxy)-17α-propadienylandrost-4-ene.

In like manner, the tetrahydropyranyl and tetrahydrofuranyl ethers of the 17α-propadienyl compounds hereof are prepared, for example, 3β-tetrahydropyran-2'-yloxy-17α-propadienyl-17β-acetoxy-18-methylandrost-4-ene, 3β-tetrahydrofuran-2'-yloxy-17α-propadienyl-17β-heptanoyloxyestr-5(10)-ene, 3-β,17β-bis(tetrahydropyran-2'-yloxy)-17α-propadienyl-18-ethylandrost-4-ene, 3β-tetrahydropyran-2'-yloxy-17α-propadienyl-17β-adamantoyloxy-18-methylestr-4-ene, 3β,17β-bis(tetrahydropyran-2'-yloxy)-6,6-difluoro-17α-propadienyl-18-ethylandrost-4-ene, and 17α-propadienyl-18-ethylestra-4,9(10),11-triene.

EXAMPLE 22

A mixture of 1 g. of 17α-propadienyl-17β-acetoxyestr-4-en-3β-ol, 4 ml. of pyridine and 2 ml. of acetic anhydride is allowed to stand at room temperature for 15 hours. The mixture is then poured into ice water and the solid which forms is collected by filtration, washed with water and dried to yield 3β,17β-diacetoxy-17α-propadienylestr-4-ene which may be further purified through recrystallization from acetone:hexane.

Similarly, the corresponding 3β-esters of the other 17α-propadienyl products thereof are prepared upon substitution of the appropriate starting compound and conventional acylating agent, for example, 3β-trimethylacetoxy-17α-propadienyl-17β-acetoxyestr-4-ene, 3β,17β-propionyloxy-17α-propadienylandrost-4-ene, 3β-butyryloxy-6,6-difluoro-17α-propadienyl-17β-tetrahydropyran-2'-yloxyestr-4-ene, 3β-pentanoyloxy-17α-propadienyl-17β-acetoxyestr-5(10)-ene, 3β,17β-bis(benzoyloxy)-17α-propadienylandrost-4-ene, 3β-acetoxy-6,6-difluoro-17α-propadienyl-17β-propionyloxyandrost-4-ene, and 17α-propadienyl-17β-propionyloxyestra-4,9(10),11-triene.

EXAMPLE 23

The corresponding C-3 substituted derivatives of the 17α-propadienyl products in the estrogen series are prepared in accordance with the above procedures using the 3β-hydroxyl derivative as starting compound. This starting compound can be formed after the principal reaction hereof upon conventional hydrolysis of the protection grouping, such as tetrahydropyran-2'-yloxy grouping, with acid hydrolysis. Representative 3β-substituted compounds of this series thus prepared are 3-acetoxy-17α-propadienyl-17β-tetrahydrofuran-2'-yloxyestra-1,3,5(10)-triene, 3,17β-diacetoxy-17α-propadienylestra-1,3,5(10)-triene, 3,17β-bis(benzoyloxy)-17α-propadienyl-18-ethylestra-1,3,5(10)-triene, and 3-caproyloxy-17α-propadienyl-17β-tetrahydrofuran-2'-yloxy-18-propylestra-1,3,5(10)-triene.

Further representative 6,6-difluoro-17α-propadienylandrost-4-enes and 17α-propadienylestra-4,9(10),11-trienes are prepared in accordance with the above procedures are as follows:

3β,17β-diacetoxy-6,6-difluoro-17α-propadienyl-18-n-propylestr-4-ene,

3β,17β-diacetoxy-17α-propadienyl-18-n-propylestra-4,9(10),11-triene,

3β,17β-diacetoxy-6,6-difluoro-17α-propadienyl-18-methylestr-4-ene,

3β,17β-diacetoxy-17α-propadienyl-18-methylestra-4,9(10),11-triene,

3β,17β-diacetoxy-6,6-difluoro-17α-propadienyl-18-ethylandrost-4-ene,

3β,17β-diacetoxy-17α-propadienyl-18-ethylestra-4,9(10),11-triene,

3β,17β-dipropionyloxy-6,6-difluoro-17α-propadienylestr-4-ene,

3β,17β-dipropionyloxy-17α-propadienylestra-4,9(10), 11-triene,

3β,17β-dipropionyloxy-6,6-difluoro-17α-propadienyl-18-methylandrost-4-ene,

3β,17β-dipropionyloxy-17α-propadienyl-18-methylestra-4,9(10),11-triene,

3β,17β-bis(tetrahydropyran-2'-yloxy)-6,6-difluoro-18-isopropylestr-4ene,

3β,17β-bis(tetrahydropyran-2'-yloxy)-18-isopropylestr-4,9-(10),11-triene.

3β,17β-bis(tetrahydropyran-2'-yloxy)-6,6-difluoroandrost-4-ene, 4-ene,

3β, 17β-bis(tetrahydropyran-2'-yloxy)-estra-4,9(10),11-triene,

3β,17β-bis(tetrahydrofuran-2'-yloxy)-6,6-difluoro-18-ethylandrost-4-ene,

3β,17β-bis(tetrahydrofuran-2'-yloxy)-18-ethylestra-4,9(10),11-triene,

3β,17β-bis(tetrahydrofuran-2'-yloxy)-6,6-difluoroestr-4-ene,

3β,17β-bis(tetrahydrofuran-2'-yloxy)-estra-4,9(10),11-triene, 6,6-difluoro-17α-propadienyl-17β-propionyloxyestr-4-en-3-one, 17α-propadienyl-17β-propionyloxyestra-4,9(10),11-triene, 6,6-difluoro-17α-propadienyl-17β-butyryloxyandrost-4-en-3-one, 17α-propadienyl-17β-butyryloxyestra-4,9(10),11-trien-3-one, 6,6-difluoro-17α-propadienyl-17β-pentanoyloxyestr-4-en-3-one, 17α-propadienyl-17β-pentanoyloxyestra-4,9(10),11-triene, 6,6-difluoro-17α-propadienyl-17β-hexanoyloxyestr-4-en-3-one, 17α-propadienyl-17β-hexanoyloxyestra-4,9(10),11-trien-3-one, 6,6-difluoro-17α-propadienyl-17β-heptanoyloxyandrost-4-en-3-one, 17α-propadienyl-17β-heptanoyloxyestra-4,9(10),11-triene, 6,6-difluoro-17α-propadienyl-17β-caproyloxyandrost-4-en-3-one, 17α-propadienyl-17β-caproyloxyestra-4,9(10),11-triene, 6,6-difluoro-17α-propadienyl-17β-benzoyloxyestr-4-en-3-one, 17α-propadienyl-17β-benzoyloxyestra-4,9(10),11-trien-3-one, 6,6-difluoro-17α-propadienyl-17β-adamantoyloxyandrost-4-en-3-one, 17α-propadienyl-17β-adamantoyloxyestra-4,9(10),11-trien-3-one, 6,6-difluoro-17α-propadienyl-17β-(β-chloropropionyloxy)-estr-4-en-3-one, 17α-propadienyl-17β-(β-chloropropionyloxy)-estra-4,9(10), 11-trien-3-one, 6,6-difluoro-17α-propadienyl-17β-trimethylacetoxyestr-4-en-3-one, 17α-propadienyl-17β-trimethylacetoxyestra-4,9(10),11-trien-3-one, 6,6-difluoro-17α-propadienyl-18-methylestr-4-en-17β-ol-3-one, 17α-propadienyl-18-methylestra-4,9(10),11-trien-3-one, 6,6-difluoro-17α-propadienyl-17β-acetoxy-18-methylestr-4-en-3-one, 17α-propadienyl-17β-acetoxy-18-methylestr-4,9(10), 11-trien-3-one, 6,6-difluoro-17α-propadienyl-17β-acetoxyestr-4-en-3-one, and 17α-propadienyl-17β-acetoxyestra-4,9(10),11-trien-3-one.

What is claimed is:

1. The method which comprises treating a 17α-(3-substituted propynyl) steroid, wherein the substituent is tetrahydrofuran-2-yloxy, tetrahydropyran-2-yloxy, 4-methoxytetrahydropyran-4-yloxy, halo, alkylsulfonyloxy or arylsulfonyloxy, together with an aluminum hydride reagent selected from the group consisting of aluminum hydride, lithium aluminum hydride, lithium di-(2-methoxyethoxy)-aluminum hydride, lithium diisobutylaluminum hydride and sodium aluminum hydride, at a temperature of from about 20° to about 120°C., whereby to provide the corresponding 17α-propadienyl compound represented by the following formulas:

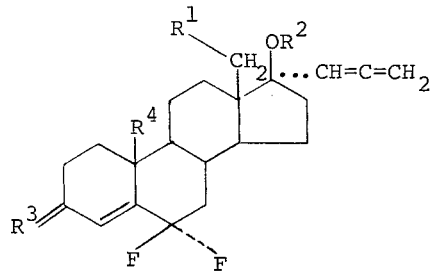

(A)

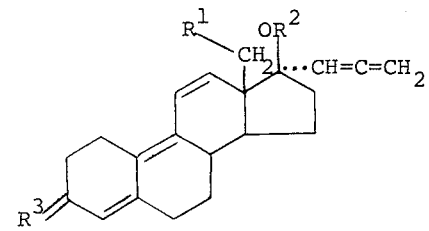

(B)

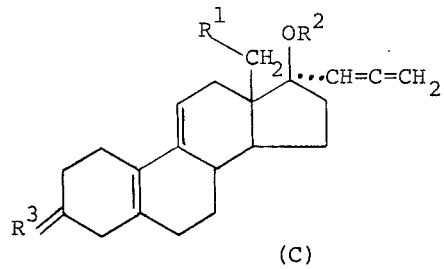

(C)

—Continued

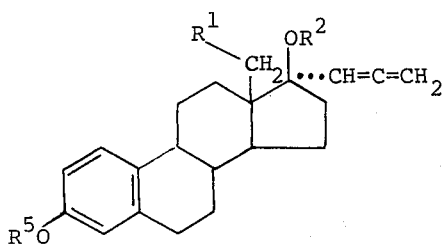

(II)

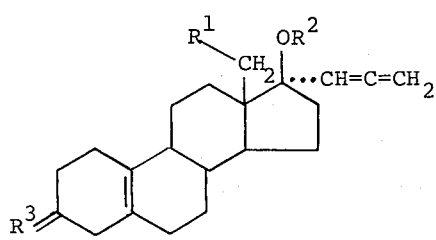

(III)

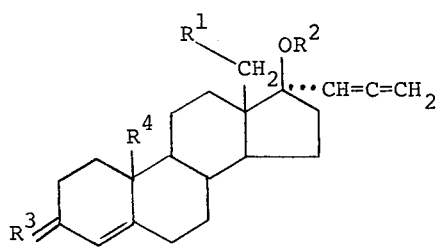

(IV)

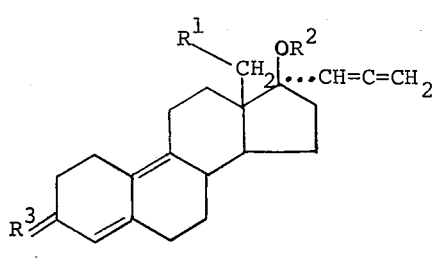

(V)

wherein,

R$^1$ is hydrogen or lower alkyl of from one to three carbon atoms, inclusive;

R$^2$ is hydrogen, tetrahydrofuran-2-yl, tetrahydropyran-2-yl, 4-methoxytetrahydropyran-4-yl, or a carboxylic acyl group containing less than 12 carbon atoms;

R$^3$ is an oxo group or the group

in which R$^6$ is hydrogen, tetrahydrofuran-2-yl, tetrahydropyran-2-yl, 4-methoxytetrahydropyran-4-yl, or a carboxylic acyl group containing less than 12 carbon atoms;

R$^4$ is hydrogen or methyl; and

R$^5$ is hydrogen, lower alkyl of from 1 to 8 carbon atoms, inclusive, cycloalkyl, tetrahydrofuran-2-yl, tetrahydropyran-2-yl, 4-methoxytetrahydropyran-4-yl or a carboxylic acyl group containing less than 12 carbon atoms.

2. The process according to claim 1 wherein the reagent is lithium aluminum hydride.

3. The process according to claim 2 conducted in diethyl ether.

4. The process according to claim 1 wherein the reagent is employed in at least chemical equivalent amounts with the 17α-(3-substituted propynyl) steroid.

5. The process according to claim 1 wherein, in said 17α-(3-substituted propynyl) steroid, the substituent is tetrahydropyran-2-yloxy, tetrahydrofuran-2-yloxy, or 4-methoxytetrahydropyran-4-yloxy.

6. The process according to claim 6 wherein the substituent is tetrahydropyran-2-yloxy.

7. The process according to claim 6 wherein said reagent is lithium aluminum hydride.

8. The process according to claim 7 conducted in diethyl ether.

9. The process according to claim 1 wherein a 17α-propadienylestr-4-ene or 17α-propadienyl-18-methylestr-4-ene steroid is prepared.

10. The process according to claim 1 wherein a 6,6-difluoro-17α-propadienylestr-4-ene or a 6,6-difluoro-17α-propadienyl-18-methylestr-4-ene steroid is prepared.

11. The process according to claim 1 wherein a 17α-propadienylestra-5(10),9(11)-diene, 17α-propadienylestra-4,9(10)-diene, or 17α-propadienylestra-4,9(10),11-triene steroid is prepared.

12. A compound selected from those represented by the formula:

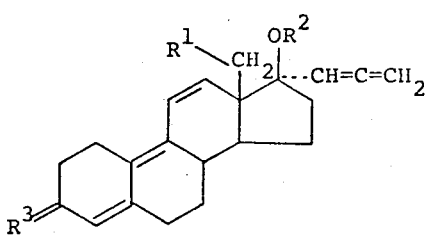

wherein R$^1$ is hydrogen or lower alkyl of from 1 to 3 carbon atoms, inclusive, R² is hydrogen, tetrahydrofuran-2-yl, tetrahydropyran-2-yl, 4-methoxytetrahydropyran-4-yl, or a carboxylic acyl group containing less than 12 carbon atoms; and R³ is an oxo group or the group

in which R⁶ is hydrogen, tetrahydrofuran-2-yl, tetrahydropyran-2-yl, 4-methoxytetrahydropyran-4-yl, or a carboxylic acyl group containing less than 12 carbon atoms.

13. The compound according to claim 12 wherein R¹ is hydrogen, R² is hydrogen, and R³ is an oxo group; 17-α-propadienylestra-4,9(10),11-trien-17β-ol-3-one.

14. The compound according to claim 12 wherein R¹ is methyl, R² is hydrogen, and R³ is an oxo group; 17α-propadienyl-18-mehylestra-4,9(10),11-trien-17β-ol-3-one.

15. The compound according to claim 12 wherein R¹ is hydrogen, R² is acetyl, and R³ is an oxo group; 17α-propadienyl-17β-acetoxyestra-4,9(10),11-trien-3-one.

16. The compound according to claim 12 wherein R¹ is methyl, R² is acetyl, and R³ is an oxo group; 17α-propadienyl-17β-acetoxy-18-methylestra-4,9(10),11-trien-3-one.

17. A compound selected from those of claim 12 of the formula:

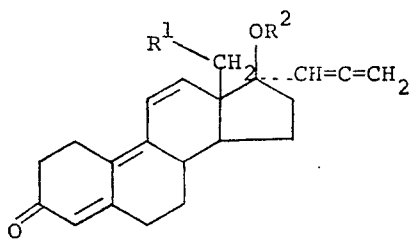

wherein R¹ is hydrogen or methyl and R² is hydrogen or a carboxylic acyl group containing less than 12 carbon atoms.

18. A compound selected from those represented by the following formulas:

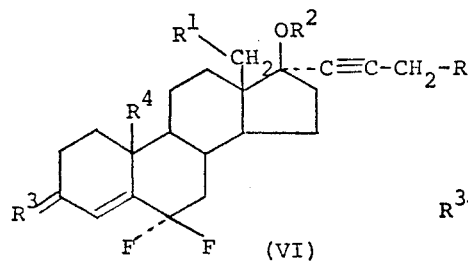

(VI)

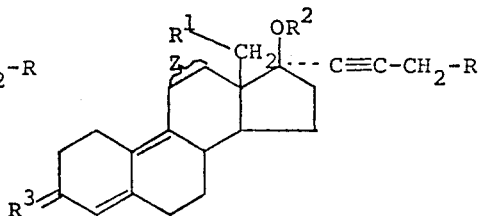

(VII)

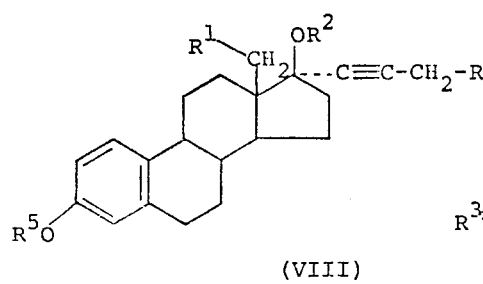

(VIII)

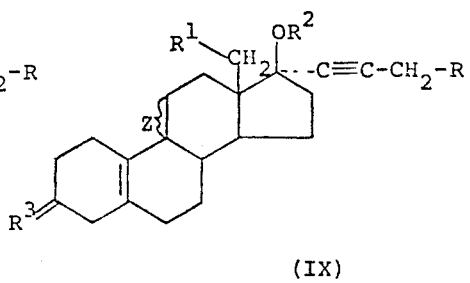

(IX)

wherein R is tetrahydrofuran-2-yloxy, tetrahydropyran-2-yloxy, 4-methoxytetrahydropyran-4-yloxy, halo, alkylsulfonyloxy, hydroxy or arylsulfonyloxy;

R¹ is hydrogen or lower alkyl of from one to three carbon atoms, inclusive;

R² is hydrogen, tetrahydrofuran-2-yl, tetrahydropyran-2-yl, 4-methoxytetrahydropyran-4-yl, or a carboxylic acyl group containing less than 12 carbon atoms;

R³ is an oxo group of the group

in which R⁶ is hydrogen, tetrahydrofuran-2-yl, tetrahydropyran-2-yl, 4-methoxytetrahydropyran-4-yl, or a carboxylic acyl group containing less than 12 carbon atoms;

R⁴ is hydrogen or methyl;

R⁵ is hydrogen, lower alkyl of from one to eight carbon atoms, inclusive, cycloalkyl, tetrahydrofuran-2-yl, tetrahydropyran-2-yl, 4-methoxytetrahydropyran-4-yl or a carboxylic acyl group containing less than 12 carbon atoms;

and each Z is a carbon-carbon single bond or a carbon-carbon double bond;

and the C-3 ketals of the compounds of formulas (VI), (VII), and (IX).

19. The compound according to claim 18 wherein R is tetrahydropyran-2-yloxy or chloro.

20. The compound according to claim 19 of Formula (VI).

21. The compound according to claim 19 of Formula (VII).

22. A compound selected from those represented by the following formula:

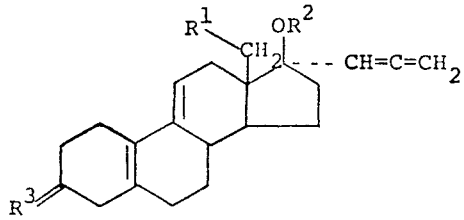

wherein R¹ is hydrogen or lower alkyl of from one to three carbon atoms, inclusive;

R² is hydrogen, tetrahydrofuran-2-yl, tetrahydropyran-2-yl, 4-methoxytetrahydropyran-4-yl, or a carboxylic acyl group containing less than 12 carbon atoms; and R³ is an oxo group of the group

in which R⁶ is hydrogen, tetrahydrofuran-2-yl, tetrahydropyran-2-yl, 4-methoxytetrahydropyran-4-yl, or a carboxylic acyl group containing less than 12 carbon atoms.

23. A compound of the formula:

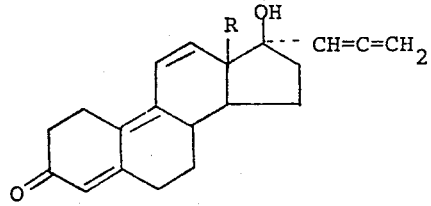

wherein R is alkyl having from 1 to 4 carbon atoms.

* * * * *